（12）United States Patent
Sasaki

(10) Patent No.: US 9,709,424 B2
(45) Date of Patent: Jul. 18, 2017

(54) INDUCTIVE DETECTION TYPE ROTARY ENCODER

(71) Applicant: MITUTOYO CORPORATION, Kawasaki, Kanagawa (JP)

(72) Inventor: Kouji Sasaki, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 99 days.

(21) Appl. No.: 14/977,844

(22) Filed: Dec. 22, 2015

(65) Prior Publication Data

US 2016/0187160 A1    Jun. 30, 2016

(30) Foreign Application Priority Data

Dec. 26, 2014 (JP) ................. 2014-264468
Dec. 26, 2014 (JP) ................. 2014-264469

(51) Int. Cl.
*G01D 5/20* (2006.01)

(52) U.S. Cl.
CPC ................. *G01D 5/2073* (2013.01)

(58) Field of Classification Search
CPC  G01D 5/12; G01D 5/14; G01D 5/20–5/2291; G01D 5/24452; G01D 5/245–5/2458; G01B 7/30; G01B 3/18
See application file for complete search history.

(56) References Cited

U.S. PATENT DOCUMENTS

| 7,385,389 | B2 | 6/2008 | Tahara et al. | |
| 2005/0122197 | A1* | 6/2005 | Aoki | G01D 5/2086 336/115 |
| 2010/0231206 | A1* | 9/2010 | Kobayashi | G01B 7/30 324/207.25 |
| 2011/0227562 | A1 | 9/2011 | Sasaki | |
| 2012/0068693 | A1* | 3/2012 | Ocket | G01D 5/2046 324/207.17 |

(Continued)

FOREIGN PATENT DOCUMENTS

| JP | 2006-322927 | 11/2006 |
| JP | 4869769 | 2/2012 |

(Continued)

*Primary Examiner* — Huy Q Phan
*Assistant Examiner* — David Frederiksen
(74) *Attorney, Agent, or Firm* — Rankin, Hill & Clark LLP

(57) ABSTRACT

An inductive detection type rotary encoder of the present invention includes: first and second transmission windings in a stator; first and second reception windings within first and second regions, respectively; and first and second magnetic flux coupling bodies within third and fourth regions, respectively, in a rotor. The second, first, third, and fourth regions are sequentially disposed in an axial direction. The shortest distance between the first transmission winding and the first magnetic flux coupling body is shorter than those between the second transmission winding and the first magnetic flux coupling body and between the first transmission winding and the second magnetic flux coupling body. The shortest distance between the second transmission winding and the second magnetic flux coupling body is shorter than those between the first transmission winding and the second magnetic flux coupling body and between the second transmission winding and the first magnetic flux coupling body.

13 Claims, 26 Drawing Sheets

(56) References Cited

U.S. PATENT DOCUMENTS

| | | | |
|---|---|---|---|
| 2013/0069637 A1* | 3/2013 | Kobayashi | G01D 5/208 324/207.17 |
| 2013/0187639 A1* | 7/2013 | Sasaki | G01B 7/30 324/207.17 |
| 2014/0203800 A1* | 7/2014 | Sasaki | G01D 5/2046 324/207.16 |

FOREIGN PATENT DOCUMENTS

| | | |
|---|---|---|
| JP | 2013-152163 | 8/2013 |
| JP | 5540308 | 7/2014 |

* cited by examiner

INDUCTIVE DETECTION TYPE ROTARY ENCODER

CROSS-REFERENCE TO RELATED APPLICATION

This non-provisional application claims priority under 35 U.S.C. §119(a) from Japanese Patent Application No. 2014-264468, filed on Dec. 26, 2014, and Japanese Patent Application No. 2014-264469, filed on Dec. 26, 2014 the entire contents of which are incorporated herein by reference.

BACKGROUND

Technical Field

The present invention relates to an inductive detection type rotary encoder that measures a rotation angle on the basis of magnetic flux coupling between wirings provided in a rotor and a stator.

Related Art

Inductive detection type rotary encoders include a stator and a rotor: the stator has a transmission winding and a reception winding, and the rotor has a magnetic flux coupling body. In an inductive detection type rotary encoder, a transmission current flows through the transmission winding while altering its flowing direction periodically. The transmission current that flows through the transmission winding generates a magnetic field. Then, the magnetic flux coupling body generates an inductive current on the basis of this magnetic field. In turn, the reception winding detects an inductive voltage on the basis of the magnetic field generated from the inductive current flowing through the magnetic flux coupling body.

To give some examples, JP 2006-322927 A discloses an inductive detection type rotary encoder that has a stator in which a plurality of transmission windings and a plurality of reception windings are stacked with an insulating layer therebetween. In addition, the inductive detection type rotary encoder has a rotor in which a plurality of magnetic flux coupling bodies are stacked with an insulating layer. JP 2006-322927 A discloses an absolute type encoder that has two tracks, each of which includes a transmission winding, a reception winding, and a magnetic flux coupling body; the tracks are disposed concentrically with each other.

JP 2013-152163 A discloses a compact inductive detection type rotary encoder in which a plurality of transmission windings, a plurality of reception windings, and a plurality of magnetic flux coupling bodies are stacked.

JP 4869769 B1 discloses an inductive detection type rotary encoder that has two tracks disposed concentrically with each other. Each track has a combination of a transmission winding and a reception winding provided in a stator and a magnetic flux coupling body provided in a rotor. The two tracks are disposed side by side in a direction that is orthogonal to a rotation axis, or in a radiation direction. JP 5540308 B1 discloses an inductive detection type rotary encoder that has four tracks disposed side by side in a radiation direction while being concentric with each other.

SUMMARY OF THE INVENTION

An object of the present invention is to provide a compact inductive detection type rotary encoder that is capable of providing highly accurate location detection.

An inductive detection type rotary encoder of the present invention includes: a stator; a rotor provided opposite the stator so as to be rotatable around a rotation axis; a first transmission winding provided in the stator, the first transmission winding having a first radius centered on the rotation axis; a second transmission winding provided in the stator, the second transmission winding having a second radius centered on the rotation axis; a first reception winding provided in the stator, the first reception winding being formed within a first region, the first region having a ring shape centered on the rotation axis, the first reception winding having a first inside radius and a first outside radius centered on the rotation axis; a second reception winding provided in the stator, the second reception winding being formed within a second region, the second region having a ring shape centered on the rotation axis, the first and second reception windings being formed with a first insulating layer therebetween, the second reception winding having a second inside radius and a second outside radius centered on the rotation axis; a first magnetic flux coupling body provided in the rotor, the first magnetic flux coupling body being formed within a third region, the third region being a ring-shaped region centered on the rotation axis and overlapping the first region in an axial direction along the rotation axis, the first magnetic flux coupling body having a third inside radius and a third outside radius centered on the rotation axis; and a second magnetic flux coupling body provided in the rotor, the second magnetic flux coupling body being formed within a fourth region, the fourth region being a ring-shaped region centered on the rotation axis and overlapping the second region in the axial direction, the first and second magnetic flux coupling bodies being formed with a second insulating layer therebetween, the second magnetic flux coupling body having a fourth inside radius and a fourth outside radius centered on the rotation axis, wherein the second region, the first region, the third region, and the fourth region are disposed in this order in the axial direction, the shortest distance between the first transmission winding and the first magnetic flux coupling body is shorter than the shortest distance between the second transmission winding and the first magnetic flux coupling body, the shortest distance between the second transmission winding and the second magnetic flux coupling body is shorter than the shortest distance between the first transmission winding and the second magnetic flux coupling body, the shortest distance between the first transmission winding and the first magnetic flux coupling body is shorter than the shortest distance between the first transmission winding and the second magnetic flux coupling body, and the shortest distance between the second transmission winding and the second magnetic flux coupling body is shorter than the shortest distance between the second transmission winding and the first magnetic flux coupling body.

The above configuration employs a structure in which the first reception winding, the second reception winding, the first magnetic flux coupling body, and the second magnetic flux coupling body are stacked, successfully decreasing the outer diameter of the inductive detection type rotary encoder. Furthermore, by setting the shortest distance between the first transmission winding and the first magnetic flux coupling body to be shorter than the shortest distance between the second transmission winding and the first magnetic flux coupling body, an influence of crosstalk that the second transmission winding exerts upon the first magnetic flux coupling body is reduced. Likewise, by setting the shortest distance between the second transmission winding and the second magnetic flux coupling body to be shorter than the shortest distance between the first transmission winding and the second magnetic flux coupling body, an influence of crosstalk that the first transmission winding exerts upon the second magnetic flux coupling body is reduced.

According to the inductive detection type rotary encoder of the present invention, the first inside radius may be larger than the second inside radius, the second outside radius may be equal to or larger than the first inside radius, and the first outside radius may be larger than the second outside radius. This configuration successfully minimizes an increase in the outer diameter of the inductive detection type rotary encoder but reserves a space used to dispose the second transmission winding therein between the second reception winding and the second magnetic flux coupling body when viewed from the axial direction.

According to the inductive detection type rotary encoder of the present invention, the third inside radius may be larger than the fourth inside radius, the fourth outside radius may be equal to or larger than the third inside radius, and the third outside radius may be larger than the fourth outside radius. This configuration successfully minimizes an increase in the outer diameter of the inductive detection type rotary encoder but reserves a space used to dispose the second transmission winding therein between the second reception winding and the second magnetic flux coupling body when viewed from the axial direction.

According to the inductive detection type rotary encoder of the present invention, the first radius may be larger than the first outside radius, and the second radius may be smaller than the first inside radius. This configuration successfully both minimizes an increase in the outer diameter of the inductive detection type rotary encoder and reduces an influence of crosstalk.

According to the inductive detection type rotary encoder of the present invention, the first transmission winding and the second transmission winding may be provided on the same layer. This configuration successfully decreases the thickness of the inductive detection type rotary encoder.

According to the inductive detection type rotary encoder of the present invention, each of the first magnetic flux coupling body and the first reception winding may be provided so as to alter its shape periodically at first pitches in a rotation direction centered on the rotation axis, and each of the second magnetic flux coupling body and the second reception winding may be provided so as to alter its shape periodically at second pitches in the rotation direction centered on the rotation axis, each second pitch differing from each first pitch. This configuration successfully provides the absolute value of a rotation angle of a rotor.

According to the inductive detection type rotary encoder of the present invention, the first magnetic flux coupling body may include a first circular current path provided in a ring shape, and the first circular current path has a radius that is centered on the rotation axis and equal to the third inside radius, and the second magnetic flux coupling body may include a second circular current path provided in a ring shape, and the second circular current path has a radius that is centered on the rotation axis and equal to the fourth outside radius. This configuration allows the first circular current path to serve as an electromagnetic shield, successfully reducing an influence of crosstalk that the second transmission winding exerts upon the first magnetic flux coupling body. Likewise, the configuration allows the second circular current path to serve as an electromagnetic shield, successfully reducing an influence of crosstalk that the first transmission winding exerts upon the second magnetic flux coupling body.

The inductive detection type rotary encoder of the present invention may further include: a first circular current path provided in a ring shape centered on the rotation axis, the first circular current path being positioned on an inner side of the first magnetic flux coupling body; and a second circular current path provided in a ring shape centered on the rotation axis, the second circular current path being positioned on an outer side of the second magnetic flux coupling body. This configuration allows the first circular current path to serve as an electromagnetic shield, successfully reducing an influence of crosstalk that the second transmission winding exerts upon the first magnetic flux coupling body. Likewise, the configuration allows the second circular current path to serve as an electromagnetic shield, successfully reducing an influence of crosstalk that the first transmission winding exerts upon the second magnetic flux coupling body.

An inductive detection type rotary encoder of the present invention includes: a stator; a rotor provided opposite the stator so as to be rotatable around a rotation axis; a first reception winding provided in the stator, the first reception winding being formed within a first region, the first region having a ring shape centered on the rotation axis; a second reception winding provided in the stator, the second reception winding being formed within a second region, the second region having a ring shape, the first and second regions being disposed side by side in a radiation direction, the radiation direction being orthogonal to the rotation axis, a first transmission winding provided in the stator, the first transmission winding being positioned on a first side of the first region, the first side being opposite to a second side of the first region on which the second region is formed; a second transmission winding provided in the stator, the second transmission winding being positioned on a second side of the second region, the second side being opposite to a first side of the second region on which the first region is formed; a first magnetic flux coupling body provided in the rotor, the first magnetic flux coupling body being formed within a third region, the third region having a ring shape centered on the rotation axis and overlapping the first region in an axial direction along the rotation axis; and a second magnetic flux coupling body provided in the rotor, the second magnetic flux coupling body being formed within a fourth region, the fourth region having a ring shape centered on the rotation axis and overlapping the second region in the axial direction, wherein the third region has a greater width than the first region in the radiation direction, the fourth region has a greater width than the second region in the radiation direction, and the third region overlaps partly the fourth region in the axial direction.

The above configuration reduces the risk that the first magnetic flux coupling body may interfere with the second magnetic flux coupling body when the first magnetic flux coupling body or the second magnetic flux coupling body is widened in the radiation direction. This is because a part of the third region in which the first magnetic flux coupling body is provided overlaps, in the axial direction, a part of the fourth region in which the second magnetic flux coupling body is provided. Therefore, the configuration successfully both minimizes an increase in the outside diameter of the inductive detection type rotary encoder and reduces an influence of the eccentricity of the stator or the rotor by widening the first and second magnetic flux coupling bodies in the radiation direction.

According to the inductive detection type rotary encoder of the present invention, the first transmission winding and the second transmission winding may be provided on the same layer. This configuration successfully decreases the thickness of the inductive detection type rotary encoder.

According to the inductive detection type rotary encoder of the present invention, each of the first magnetic flux coupling body and the first reception winding may be provided so as to alter its shape periodically at first pitches in a rotation direction centered on the rotation axis, and each of the second magnetic flux coupling body and the second reception winding may be provided so as to alter its shape periodically at second pitches in the rotation direction centered on the rotation axis, each second pitch differing from each first pitch. This configuration successfully provides the absolute value of a rotation angle of a rotor.

According to the inductive detection type rotary encoder of the present invention, the first magnetic flux coupling body may include a first circular current path provided in a ring shape, and the first circular current path has a radius that is centered on the rotation axis and equal to an inside radius of the first magnetic flux coupling body, and the second magnetic flux coupling body may include a second circular current path provided in a ring shape, and the second circular current path has a radius that is centered on the rotation axis and equal to an outside radius of the second magnetic flux coupling body. This configuration allows the first circular current path to serve as an electromagnetic shield, successfully reducing an influence of crosstalk that the second transmission winding exerts upon the first magnetic flux coupling body. Likewise, the configuration allows the second circular current path to serve as an electromagnetic shield, successfully reducing an influence of crosstalk that the first transmission winding exerts upon the second magnetic flux coupling body.

The inductive detection type rotary encoder of the present invention may further include: a first circular current path provided in a ring shape centered on the rotation axis, the first circular current path being positioned on an inner side of the first magnetic flux coupling body; and a second circular current path provided in a ring shape centered on the rotation axis, the second circular current path being positioned on an outer side of the second magnetic flux coupling body. This configuration allows the first circular current path to serve as an electromagnetic shield, successfully reducing an influence of crosstalk that the second transmission winding exerts upon the first magnetic flux coupling body. Likewise, the configuration allows the second circular current path to serve as an electromagnetic shield, successfully reducing an influence of crosstalk that the first transmission winding exerts upon the second magnetic flux coupling body.

DETAILED DESCRIPTION OF THE EMBODIMENTS

Figure 1:
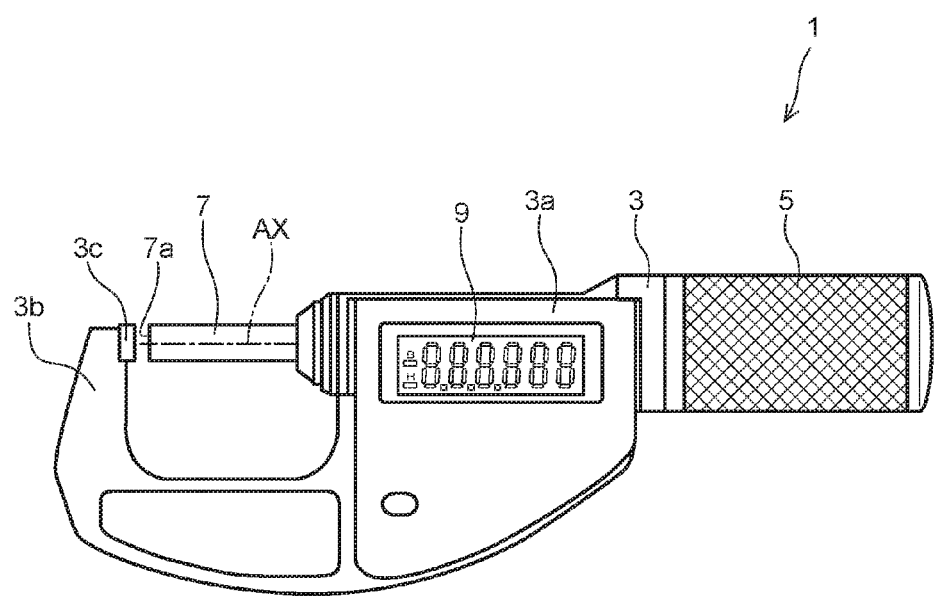
FIG. 1 is a front view illustrating an exemplary digital micrometer.

Some embodiments of the present invention will be described below with reference to the accompanying drawings. In the following description, the same reference characters are given to identical members, and members that have already been described will not be described again as appropriate.

First Embodiment

A first embodiment of the present invention will be described below with reference to some accompanying drawings. In the following description, the same reference characters are given to identical members, and members that have already been described will not be described again as appropriate.

FIG. 1 is a front view illustrating an exemplary digital micrometer that employs an inductive detection type rotary encoder in the first embodiment. As illustrated in FIG. 1, a digital micrometer 1 includes a frame 3, a thimble 5, a spindle 7, and a display 9. The frame 3 has a main body 3a and an anvil section 3b; the main body 3a supports both the thimble 5 and the spindle 7, and the anvil section 3b is positioned a predetermined distance away from the main body 3a. The thimble 5 is rotatably attached to the main body 3a of the frame 3; the spindle 7 is rotatably supported as a gauge head by the main body 3a of the frame 3.

The spindle 7 has an end 7a that protrudes from the main body 3a of the frame 3 toward the anvil section 3b; the anvil section 3b has an anvil 3c that faces the end 7a of the spindle 7. The other end of the spindle 7 is inserted into the main body 3a of the frame 3, and a feed screw (not illustrated in FIG. 1) is formed at this end of the spindle 7. This feed screw is inserted into a nut (not illustrated in FIG. 1) provided in the thimble 5.

The display 9 is provided on the exterior of the main body 3a of the frame 3. The display 9 is implemented using, for example a liquid crystal display panel that displays numeric values and the like in accordance with a segment scheme. With the structure described above, when the thimble 5 is rotated in the forward direction, the spindle 7 moves toward the anvil 3c along the axis of the spindle 7 (rotation axis AX). The distance between the spindle 7 and the anvil 3c thereby decreases. When the thimble 5 is rotated in the reverse direction, the spindle 7 moves away from the anvil 3c along the axis of the spindle 7 (rotation axis AX). The distance between the spindle 7 and the anvil 3c thereby increases.

When a size of an object is measured, the object is placed between the end 7a of the spindle 7 and the anvil 3c, and held therebetween by rotating the thimble 5 in the forward direction. The distance between the end 7a of the spindle 7 and the anvil 3c is displayed on the display 9 as a measurement.

Next, a configuration of the inductive detection type rotary encoder in this embodiment will be described.

Figure 2:
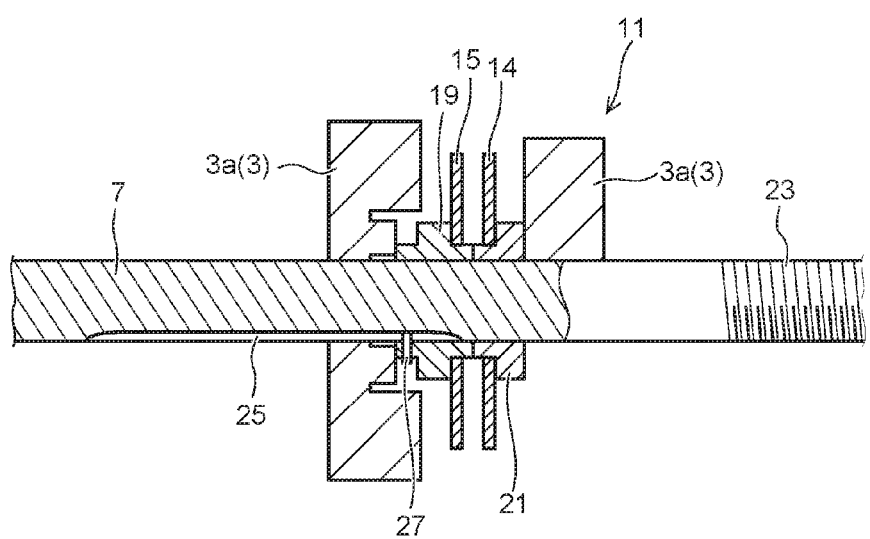
FIG. 2 is a cross section view illustrating an exemplary configuration of an inductive detection type rotary encoder in a first embodiment of the present invention.

FIG. 2 is a cross section view illustrating an exemplary configuration of the inductive detection type rotary encoder in this embodiment.

As illustrated in FIG. 2, an inductive detection type rotary encoder 11 is provided in the main body 3a of the frame 3.

The inductive detection type rotary encoder 11 includes a stator 14 and a rotor 15; the stator 14 is fixed to the main body 3a of the frame 3 with a stator bush 21 therebetween, and the rotor 15 is placed opposite the stator 14 so as to be rotatable around the rotation axis AX. In addition, the rotor 15 is fixed to an edge of a cylindrical rotor bush 19. The spindle 7 is inserted into both the rotor bush 19 and the stator bush 21.

A feed screw 23 that is inserted into a nut disposed inside the thimble 5 is formed on the surface of the spindle 7. A key groove 25 is formed on the surface of the spindle 7 in its longitudinal direction (a movement direction of the spindle 7). An end of a pin 27 fixed to the rotor bush 19 fits into the key groove 25. When the spindle 7 rotates, its rotational force is transmitted to the rotor bush 19 through the pin 27 whereby the rotor 15 rotates. Specifically, the rotor 15 rotates together with the spindle 7. Since the pin 27 is not fixed to the key groove 25, the rotor 15 rotates without involving the movement of the spindle 7. The stator bush 21 does not rotate together with the spindle 7. In other words, when the spindle 7 rotates, the stator 14 stays fixed.

Next, configurations of the stator 14 and the rotor 15 will be described.

Figure 3:
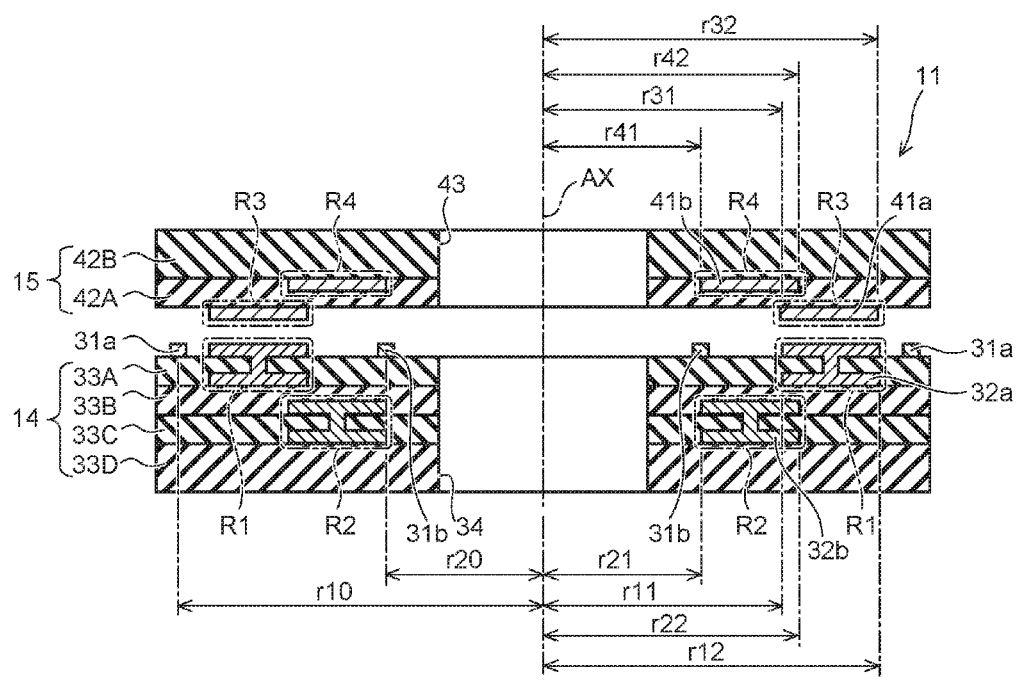
FIG. 3 is a schematic cross section view illustrating exemplary configurations of a stator and a rotor.

FIG. 3 is a schematic cross section view illustrating exemplary configurations of a stator and a rotor.

As illustrated in FIG. 3, the stator 14 includes stacked insulating layers 33A, 33B, 33C and 33D. The insulating layers 33A, 33B, 33C and 33D are stacked in this order in the direction away from the rotor 15. A hole 34 through which the spindle 7 is to pass is formed in all of the insulating layers 33A, 33B, 33C and 33D.

The rotor 15 includes stacked insulating layers 42A and 42B. The insulating layers 42A and 42B are stacked in this order in the direction away from the stator 14. A hole 43 through which the spindle 7 is to pass is formed in both of the insulating layers 42A and 42B.

The stator 14 is provided with a first reception winding 32a and a second reception winding 32b. The first reception winding 32a is formed within a first region R1 having a ring shape centered on the rotation axis AX. A part of the first reception winding 32a is formed on the surface of the insulating layer 33A which faces the rotor 15; the other part is formed between the insulating layers 33A and 33B. Both parts are interconnected through a through-hole or a via formed across the insulating layer 33A.

The second reception winding 32b is formed within a second region R2 having a ring shape centered on the rotation axis AX. A part of the second reception winding 32b is formed between the insulating layers 33B and 33C; the other part is formed between the insulating layers 33C and 33D. Both parts are interconnected through a through-hole or a via formed across the insulating layer 33C.

The stator 14 is further provided with a first transmission winding 31a and a second transmission winding 31b, each of which has a ring shape centered on the rotation axis AX. The first transmission winding 31a is provided on the outer circumference of the stator 14, whereas the second transmission winding 31b is provided on the inner circumference of the stator 14. A current flows through the first transmission winding 31a while altering its flow direction periodically. This current generates a magnetic field, with which a first magnetic flux coupling body 41a provided in the rotor 15 is irradiated. Likewise, a current flows through the second transmission winding 31b while altering its flow direction periodically. This current generates a magnetic field, with which a second magnetic flux coupling body 41b provided in the rotor 15 is irradiated.

The rotor 15 is provided with the first magnetic flux coupling body 41a and the second magnetic flux coupling body 41b. The first magnetic flux coupling body 41a is formed in a third region R3 having a ring shape centered on the rotation axis AX. The first magnetic flux coupling body 41a is provided on the surface of the insulating layer 42A which faces the stator 14. The second magnetic flux coupling body 41b is formed in a fourth region R4 having a ring shape centered on the rotation axis AX. The second magnetic flux coupling body 41b is formed between the insulating layers 42A and 42B.

In this embodiment, the second region R2, the first region R1, the third region R3, and the fourth region R4 are sequentially disposed. In addition, the first reception winding 32a faces the first magnetic flux coupling body 41a, whereas the second reception winding 32b faces the second magnetic flux coupling body 41b.

An operation of the inductive detection type rotary encoder 11 will be described below.

In the inductive detection type rotary encoder 11, a transmission current flows through the first transmission winding 31a while altering the flow direction periodically. This transmission current generates a magnetic field, with which the first magnetic flux coupling body 41a formed in the rotor 15 is irradiated. Due to the magnetic flux coupling, an inductive current flows through the first magnetic flux coupling body 41a. In turn, the first reception winding 32a detects an inductive voltage on the basis of the magnetic field generated from the inductive current flowing through the first magnetic flux coupling body 41a.

In the inductive detection type rotary encoder 11, a transmission current flows through the second transmission winding 31b while altering the flow direction periodically. This transmission current generates a magnetic field, with which the second magnetic flux coupling body 41b formed in the rotor 15 is irradiated. Due to the magnetic flux coupling, an inductive current flows through the second magnetic flux coupling body 41b. In turn, the second reception winding 32b detects an inductive voltage on the basis of the magnetic field generated from the inductive current flowing through the second magnetic flux coupling body 41b.

In the inductive detection type rotary encoder 11 in this embodiment, the shortest distance between the first transmission winding 31a and the first magnetic flux coupling body 41a is set to be shorter than the shortest distance between the second transmission winding 31b and the first magnetic flux coupling body 41a. The shortest distance between the second transmission winding 31b and the second magnetic flux coupling body 41b is set to be shorter than the shortest distance between the first transmission winding 31a and the second magnetic flux coupling body 41b. The shortest distance between the first transmission winding 31a and the first magnetic flux coupling body 41a is set to be shorter than the shortest distance between the first transmission winding 31a and the second magnetic flux coupling body 41b. The shortest distance between the second transmission winding 31b and the second magnetic flux coupling body 41b is set to be shorter than the shortest distance between the second transmission winding 31b and the first magnetic flux coupling body 41a.

In the above configuration, a current flows through the first transmission winding 31a, generating a magnetic field. This magnetic field causes the first magnetic flux coupling body 41a to feed an inductive current therethrough. In this case, the magnetic fields generated from the first transmission winding 31a and the first magnetic flux coupling body 41a may influence the second magnetic flux coupling body 41b. In this embodiment, however, the second magnetic flux coupling body 41b is less sensitive to the magnetic fields from the first transmission winding 31a and the first magnetic flux coupling body 41a. This is because the second magnetic flux coupling body 41b is positioned away from both the first transmission winding 31a and the first magnetic flux coupling body 41a.

Likewise, a current flows through the second transmission winding 31b, generating a magnetic field. This magnetic field causes the second magnetic flux coupling body 41b to feed an inductive current therethrough. In this case, the magnetic fields generated from the second transmission winding 31b and the second magnetic flux coupling body 41b may influence the first magnetic flux coupling body 41a. In this embodiment, however, the first magnetic flux coupling body 41a is less sensitive to the magnetic fields from the second transmission winding 31b and the second magnetic flux coupling body 41b. This is because the first magnetic flux coupling body 41a is positioned away from both the second transmission winding 31b and the second magnetic flux coupling body 41b.

In this way, an influence of crosstalk that the second transmission winding 31b exerts upon the first magnetic flux coupling body 41a is reduced. Also, an influence of crosstalk from the first transmission winding 31a to the second magnetic flux coupling body 41b is reduced.

In this embodiment, to satisfy the above distant relationship, the diameter of the first reception winding 32a and the first magnetic flux coupling body 41a is set so as to differ from the diameter of the second reception winding 32b and the second magnetic flux coupling body 41b. In addition, the first transmission winding 31a is disposed close to the first magnetic flux coupling body 41a, and the second transmission winding 31b is disposed close to the second magnetic flux coupling body 41b.

A description will be given of a specific example of a method of satisfying the above positional relationship.

First, the inside radius of the first reception winding 32a which is centered on the rotation axis AX is set as a first inside radius r11, whereas the outside radius thereof is set as a first outside radius r12. The inside radius of the second reception winding 32b which is centered on the rotation axis AX is set as a second inside radius r21, whereas the outside radius thereof is set as a second outside radius r22. The inside radius of the first magnetic flux coupling body 41a which is centered on the rotation axis AX is set as a third inside radius r31, whereas the outside radius thereof is set as a third outside radius r32. The inside radius of the second magnetic flux coupling body 41b which is centered on the rotation axis AX is set as a fourth inside radius r41, whereas the outside radius thereof is set as a fourth outside radius r42. The radius of the first transmission winding 31a which is centered on the rotation axis AX is set as a first radius r10, whereas the radius of the second transmission winding 31b which is centered on the rotation axis AX is set as a second radius r20.

Herein, the inside radius of a winding or a magnetic flux coupling body corresponds to the radius of the inner circumference of the ring-shaped region when a region having the winding or the magnetic flux coupling body which is viewed from a direction along the rotation axis AX is assumed to be a ring-shaped region with a predetermined width. The outside radius thereof corresponds to the radius of the outer circumference of the ring-shaped region. The first radius corresponds to the radius of the central circumference of the first transmission winding 31a. The second radius corresponds to the radius of the central circumference of the second transmission winding 31b.

In the inductive detection type rotary encoder 11 in this embodiment, the first inside radius r11 is set to be greater than the second inside radius r21. The second outside radius r22 is set to be equal to or greater than the first inside radius r11. The first outside radius r12 is set to be greater than the second outside radius r22. With this relationship, the outer diameter of the inductive detection type rotary encoder 11 can be made smaller than an encoder in which a first reception winding 32a and a second reception winding 32b are disposed on the same layer.

In the inductive detection type rotary encoder 11 in this embodiment, the third inside radius r31 is set to be larger than the fourth inside radius r41. The fourth outside radius r42 is set to be equal to or larger than the third inside radius r31. The third outside radius r32 is set to be larger than the fourth outside radius r42. With this relationship, the outer diameter of the inductive detection type rotary encoder 11 can be made smaller than an encoder in which a first magnetic flux coupling body 41a and a second magnetic flux coupling body 41b are disposed on the same layer. When the inductive detection type rotary encoder 11 is viewed in an axial direction, the second transmission winding 31b is disposed between the second reception winding 32b and the second magnetic flux coupling body 41b. This configuration successfully reduces an influence of crosstalk that the second transmission winding 31b exerts upon the first magnetic flux coupling body 41a.

In the example illustrated in FIG. 3, the first transmission winding 31a and the second transmission winding 31b are disposed on the same layer. Furthermore, the second radius r20 is smaller than the second inside radius r21, and the first radius r10 is greater than the first outside radius r12. With this configuration, the first transmission winding 31a can be disposed close to the first magnetic flux coupling body 41a, and the second transmission winding 31b can be disposed close to the second magnetic flux coupling body 41b.

Next, a description will be given of the planar shapes of the first transmission winding 31a, the second transmission winding 31b, the first reception winding 32a, the second reception winding 32b, the first magnetic flux coupling body 41a, and the second magnetic flux coupling body 41b.

Figure 4:
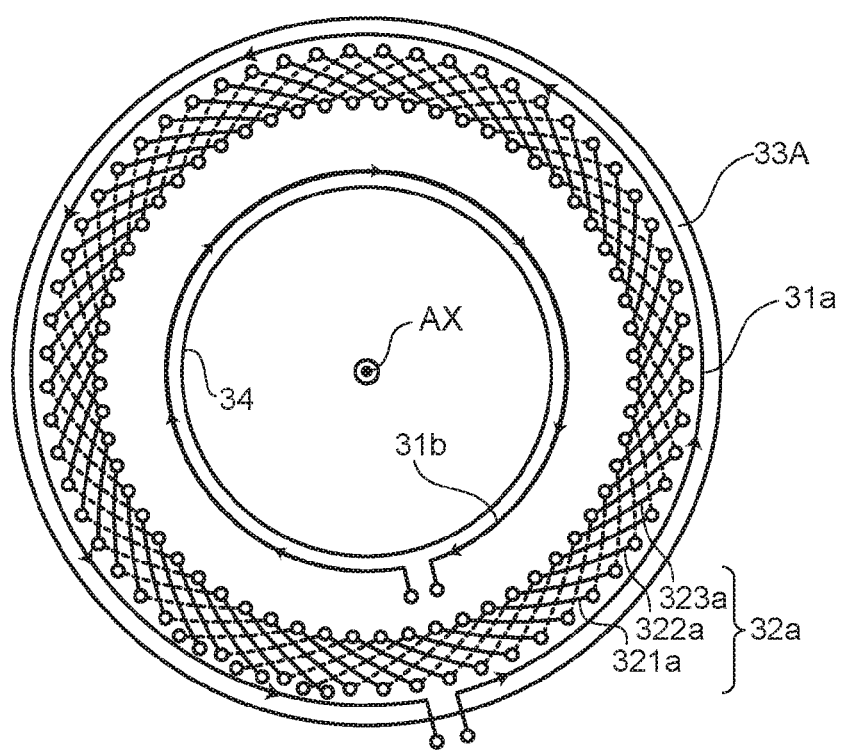
FIG. 4 is a plan view illustrating an exemplary first transmission winding, second transmission winding, and first reception winding.

FIG. 4 is a plan view illustrating an exemplary first transmission winding, second transmission winding, and first reception winding.

As illustrated in FIG. 4, the first transmission winding 31a is disposed close to the outer circumference of the insulating layer 33A; the second transmission winding 31b is disposed close to the hole 34. The ends of the wire of the second transmission winding 31b are drawn out to a site between the insulating layers 33B and 33C through a through-hole of the insulating layer 33A on the inner side of the first reception winding 32a. In this way, the wire of the second transmission winding 31b can be routed without interfering with the wire of the first reception winding 32a and increasing the outside diameter of the stator 14. Alternatively, both ends of the wire of the second transmission winding 31b may be passed through an area between the hole 34 and the second reception winding 32b and drawn out to the lower layer.

The first reception winding 32a is positioned between the first transmission winding 31a and the second transmission winding 31b and closer to the first transmission winding 31a. The first reception winding 32a includes three reception winding sections 321a to 323a having different phases in a rotational direction of the rotor 15. The reception winding sections 321a to 323a are aligned vertically at their intersections with the insulating layer 33A therebetween and interconnected there through through-holes or vias. The reception winding sections 321a to 323a are thereby disposed while being separated and insulated from one another.

Figure 5:
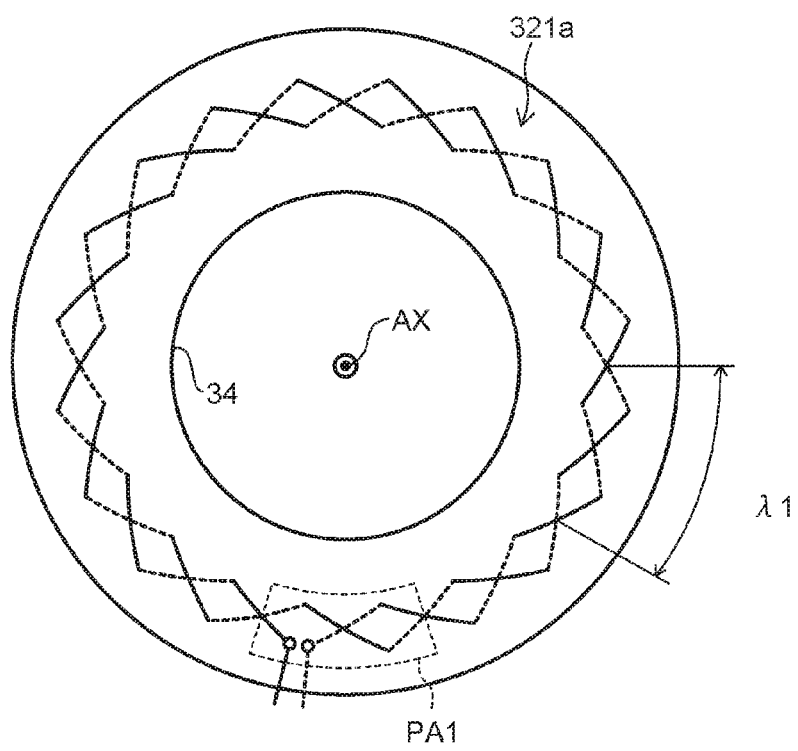
FIG. 5 is a plan view illustrating an exemplary reception winding section in the first reception winding.

FIG. 5 is a plan view illustrating an exemplary reception winding section in the first reception winding.

As illustrated in FIG. 5, the reception winding section 321a has a looped (rhombic) pattern that periodically alters the shape at pitches $\lambda 1$ in the rotational direction of the rotor 15. Specifically, ten rhombic pattern pairs PA1 are provided in the reception winding section 321a. Each of the reception winding sections 322a and 323a has substantially the same shape as in the reception winding section 321a.

Figure 6:
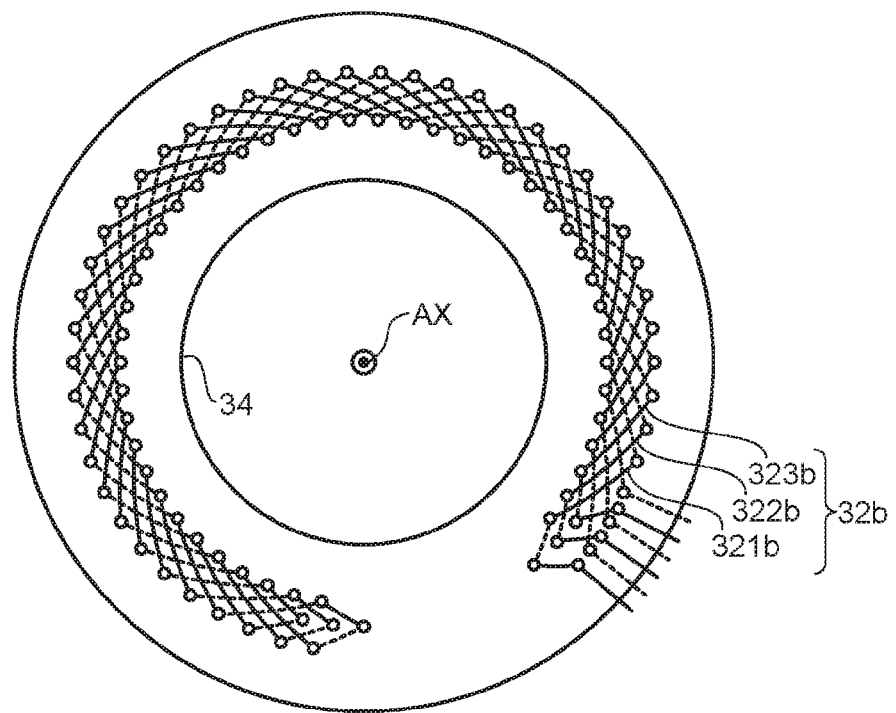
FIG. 6 is a plan view illustrating an exemplary second reception winding.

FIG. 6 is a plan view illustrating an exemplary second reception winding.

As illustrated in FIG. 6, the second reception winding 32b has substantially the shape similar to the first reception winding 32a. Specifically, the second reception winding 32b includes three reception winding sections 321b to 323b that have different phases in the rotational direction. The second reception winding 32b, however, has a smaller overall size than the first reception winding 32a. In addition, the second reception winding 32b has pitches in the rotational direction which are different from those of the first reception winding 32a.

Figure 7:
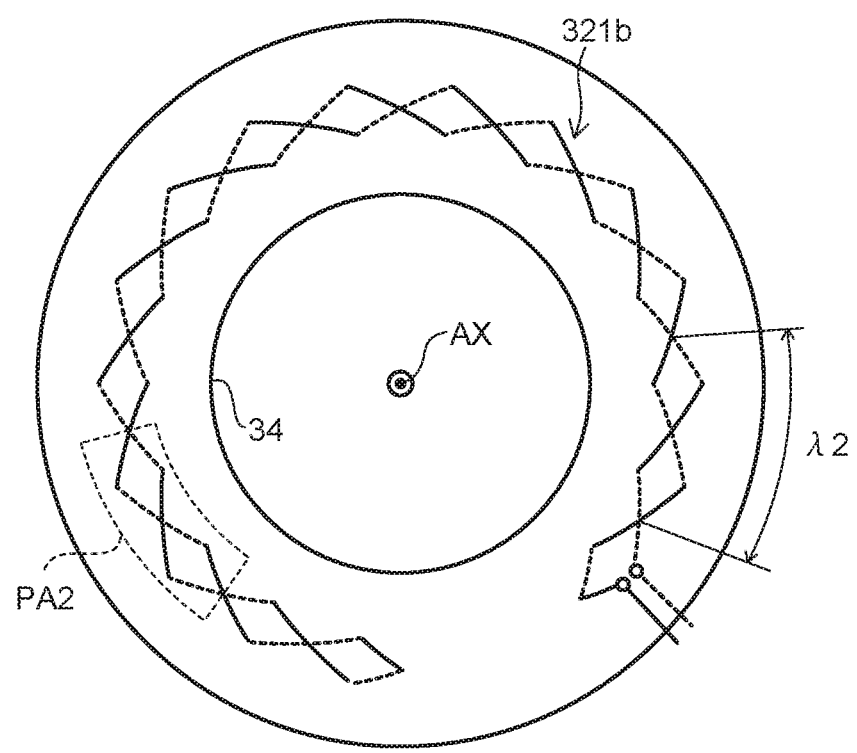
FIG. 7 is a plan view illustrating an exemplary reception winding section in the second reception winding.

FIG. 7 is a plan view illustrating an exemplary reception winding section in the second reception winding.

As illustrated in FIG. 7, the reception winding section 321b has a looped (rhombic) pattern that periodically alters the shape at pitches $\lambda 2$ in the rotational direction of the rotor 15, and each pitch $\lambda 2$ differs from each pitch $\lambda 1$. For example, each pitch $\lambda 2$ is longer than each pitch $\lambda 1$. In other words, each pitch $\lambda 1$ is shorter than each pitch $\lambda 2$. Eight rhombic pattern pairs PA2 are provided. Each of the reception winding sections 322b and 323b has substantially the same shape as in the reception winding section 321b.

Figure 8:
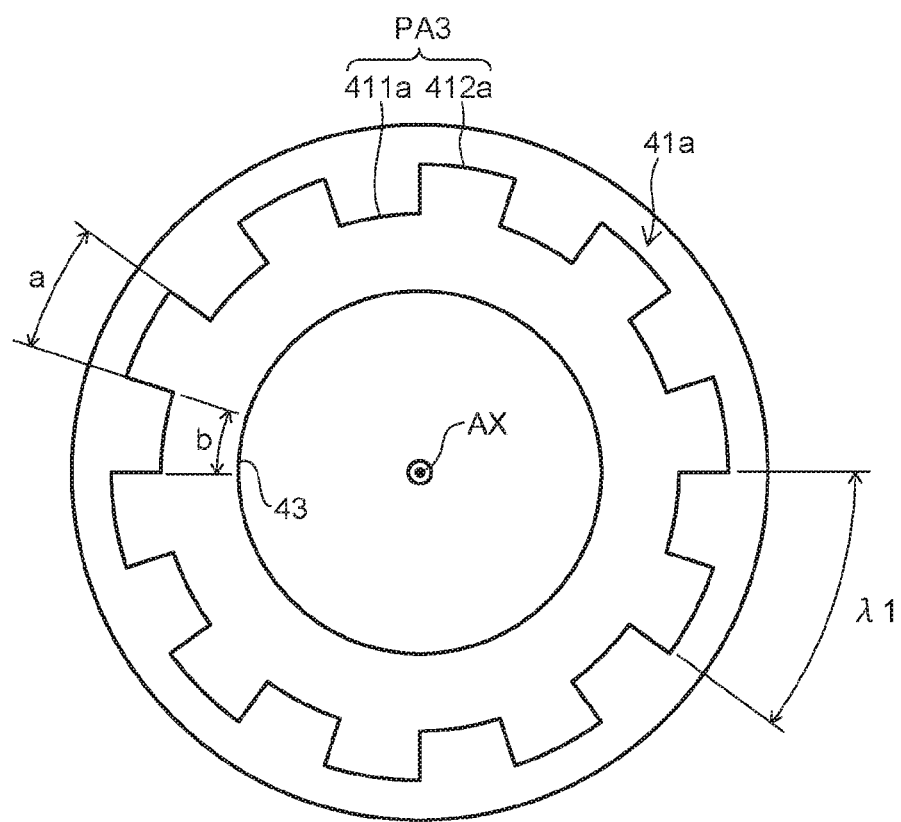
FIG. 8 is a plan view illustrating an exemplary first magnetic flux coupling body.

FIG. 8 is a plan view illustrating an exemplary first magnetic flux coupling body.

As illustrated in FIG. 8, the first magnetic flux coupling body 41a is formed over the first reception winding 32a with a gap therebetween while being coaxial with the rotation axis AX of the spindle 7. The first magnetic flux coupling body 41a has a continuous toothed pattern that periodically alters the shape at pitches $\lambda 1$ in the rotational direction of the rotor 15, and each of these pitches $\lambda 1$ is equal to each pitch $\lambda 1$ of the first reception winding 32a.

The first magnetic flux coupling body 41a includes depressions 411a and projections 412a arranged alternately; each depression 411a is depressed in a direction toward the spindle 7, and each projection 412a protrudes in a direction away from the spindle 7. In the example of FIG. 8, ten pattern pairs PA3, each of which has a depression 411a and a projection 412a, are provided.

Figure 9:
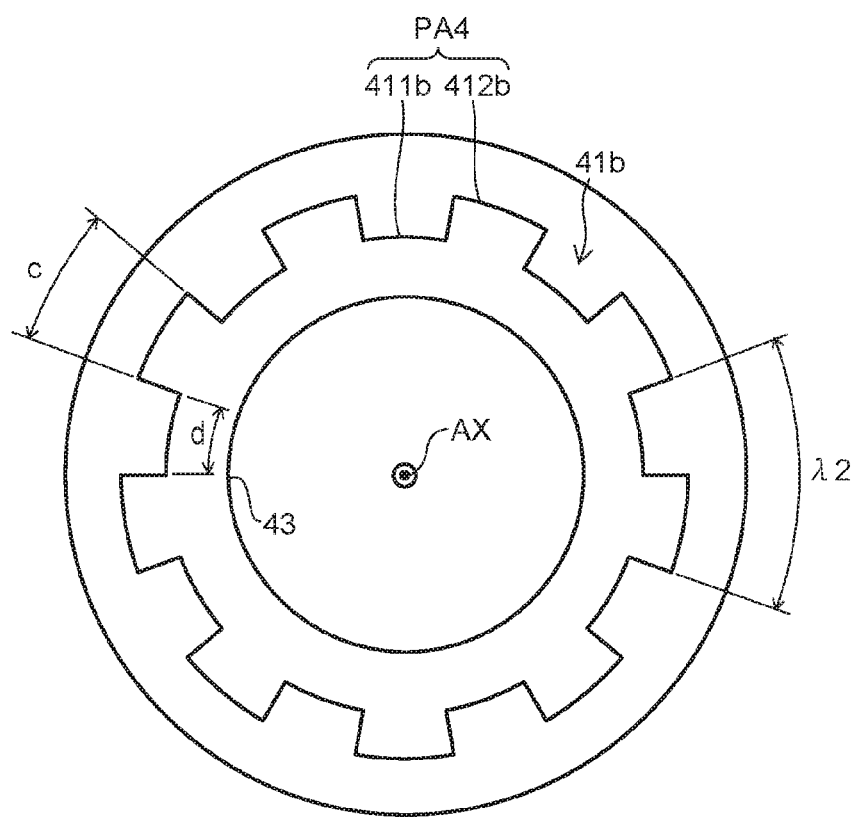
FIG. 9 is a plan view illustrating an exemplary second magnetic flux coupling body.

FIG. 9 is a plan view illustrating an exemplary second magnetic flux coupling body.

As illustrated in FIG. 9, the second magnetic flux coupling body 41b is formed coaxially with the rotation axis AX of the spindle 7. In addition, the second magnetic flux coupling body 41b has a toothed shape in which depressions 411b and projection 412b are formed alternately, similar to the first magnetic flux coupling body 41a. Pairs of the depressions 411b and projections 412b in the second magnetic flux coupling body 41b are arranged at pitches $\lambda 2$. In the example illustrated in FIG. 9, nine pattern pairs PA4 of depressions 411b and projections 412b are provided. The first magnetic flux coupling body 41a and the second magnetic flux coupling body 41b may have a toothed pattern, a sine-wave pattern, an island-shaped pattern, or any other patterns.

According to the configuration described above, the inductive detection type rotary encoder 11 in this embodiment can have a small outside diameter and provide highly accurate location detection with an influence of crosstalk reduced.

Second Embodiment

Next, a second embodiment of the present invention will be described with reference to some accompanying drawings.

Figure 10:
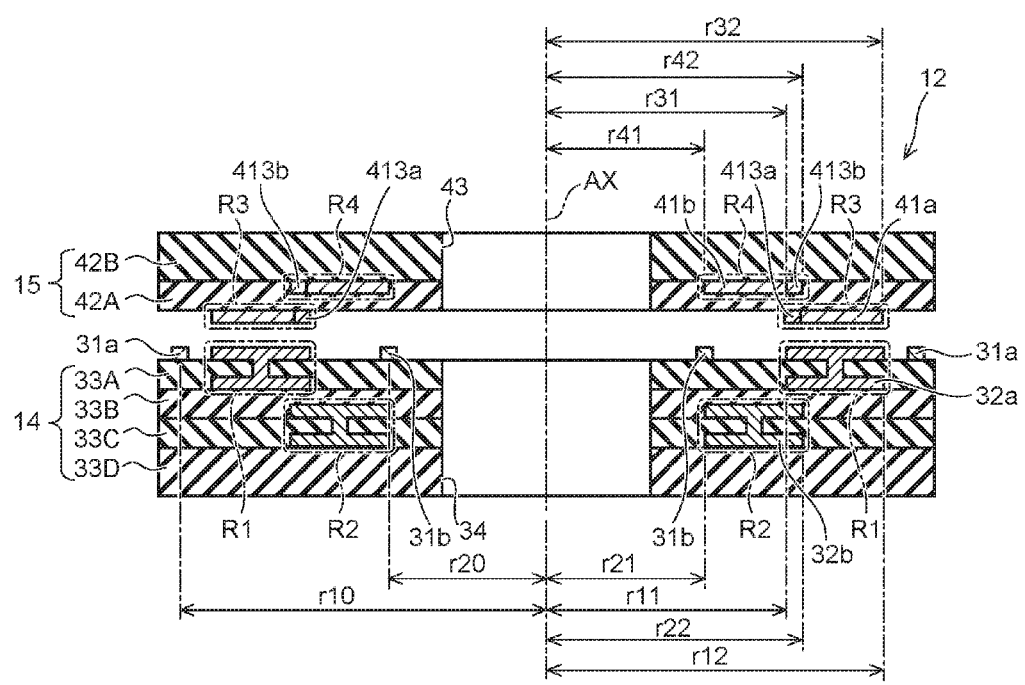
FIG. 10 is a cross section view illustrating an exemplary inductive detection type rotary encoder in a second embodiment of the present invention.

FIG. 10 is a cross section view illustrating an exemplary inductive detection type rotary encoder in the second embodiment.

Figure 11:
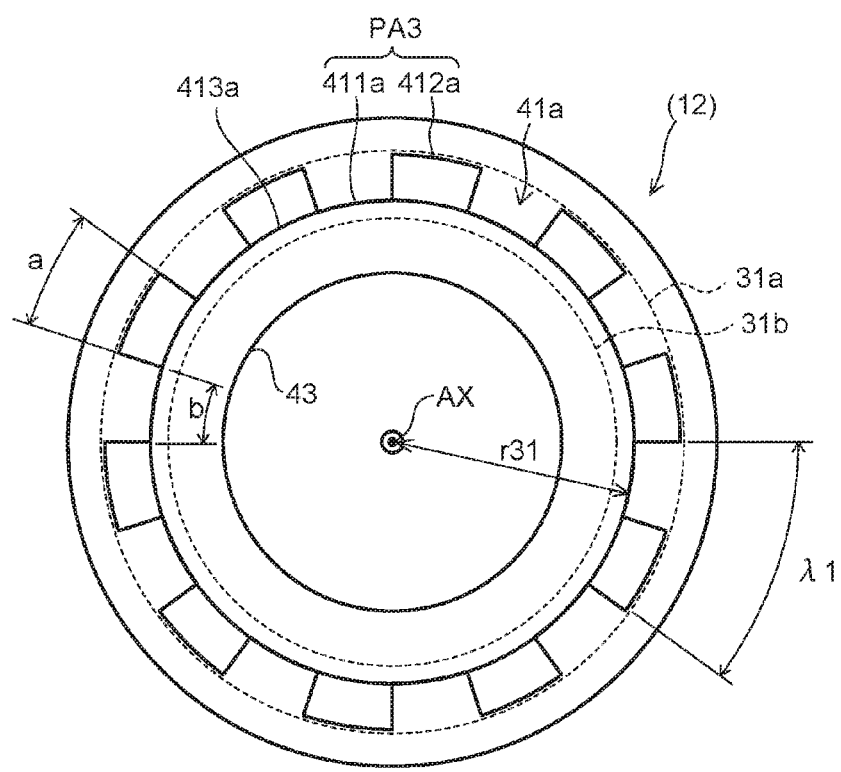
FIG. 11 is a plan view illustrating an exemplary magnetic flux coupling body in the second embodiment.
Figure 12:
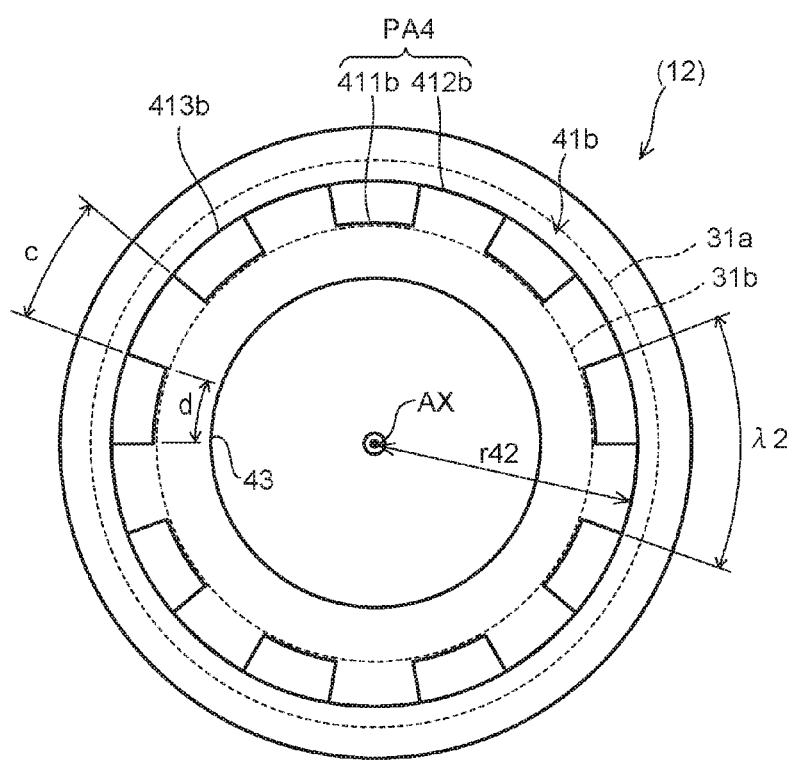
FIG. 12 is a plan view illustrating an exemplary magnetic flux coupling body in the second embodiment.

FIGS. 11 and 12 are plan views illustrating exemplary first and second magnetic flux coupling bodies, respectively, in the second embodiment.

In an inductive detection type rotary encoder 12 in the second embodiment, a first magnetic flux coupling body 41a includes a first circular current path 413a, and a second magnetic flux coupling body 41b includes a second circular current path 413b.

As illustrated in FIG. 11, the inductive detection type rotary encoder 12 in the second embodiment is provided with the first circular current path 413a in the first magnetic flux coupling body 41a. The first circular current path 413a has a ring shape centered on a rotation axis AX and its radius is nearly equal to the third inside radius r31. The first circular current path 413a shares its portion with depressions 411a.

As illustrated in FIG. 12, the second circular current path 413b is provided in the second magnetic flux coupling body 41b. The second circular current path 413b has a ring shape centered on the rotation axis AX and its radius is nearly equal to the fourth outside radius r42. The second circular current path 413b shares its portion with projections 412b.

The configuration of the inductive detection type rotary encoder 12 in the second embodiment is substantially the same as that of the inductive detection type rotary encoder 11 in the first embodiment, aside from the first magnetic flux coupling body 41a and the second magnetic flux coupling body 41b. In the inductive detection type rotary encoder 12 in the second embodiment, the first circular current path 413a and the second circular current path 413b each serve as an electromagnetic shield.

To give an example, the first circular current path 413a is provided on the side of the first magnetic flux coupling body 41a which is closer to a second transmission winding 31b. Thus, the first circular current path 413a can come under the influence of the magnetic field generated from the second transmission winding 31b, and prevent the influence of the magnetic field on the first magnetic flux coupling body 41a. In this case, the first circular current path 413a serves as a shield against the magnetic field generated from the second transmission winding 31b. Using the first circular current path 413a as the shield reduces the influence that the magnetic field generated from the second transmission winding 31b exerts upon the first magnetic flux coupling body 41a. This enables the first magnetic flux coupling body 41a to adequately feed a current based on the magnetic field from a first transmission winding 31a.

Likewise, the second circular current path 413b is provided on the side of the second magnetic flux coupling body 41b which is closer to the first transmission winding 31a. Thus, the second circular current path 413b can come under the influence of the magnetic field generated from the first transmission winding 31a, and prevent the influence of the magnetic field on the second magnetic flux coupling body 41b. In this case, the second circular current path 413b serves as a shield against the magnetic field generated from the first transmission winding 31a. Using the second circular current path 413b as the shield reduces the influence that the magnetic field generated from the first transmission winding 31a exerts upon the second magnetic flux coupling body 41b. This enables the second magnetic flux coupling body 41b to adequately feed a current based on the magnetic field from the second transmission winding 31b.

The inductive detection type rotary encoder 12 in the second embodiment can provide highly accurate location detection with an influence of crosstalk reduced, by utilizing the shielding effects of the first circular current path 413a and the second circular current path 413b.

Third Embodiment

Next, a third embodiment of the present invention will be described with reference to some accompanying drawings.

Figure 13:
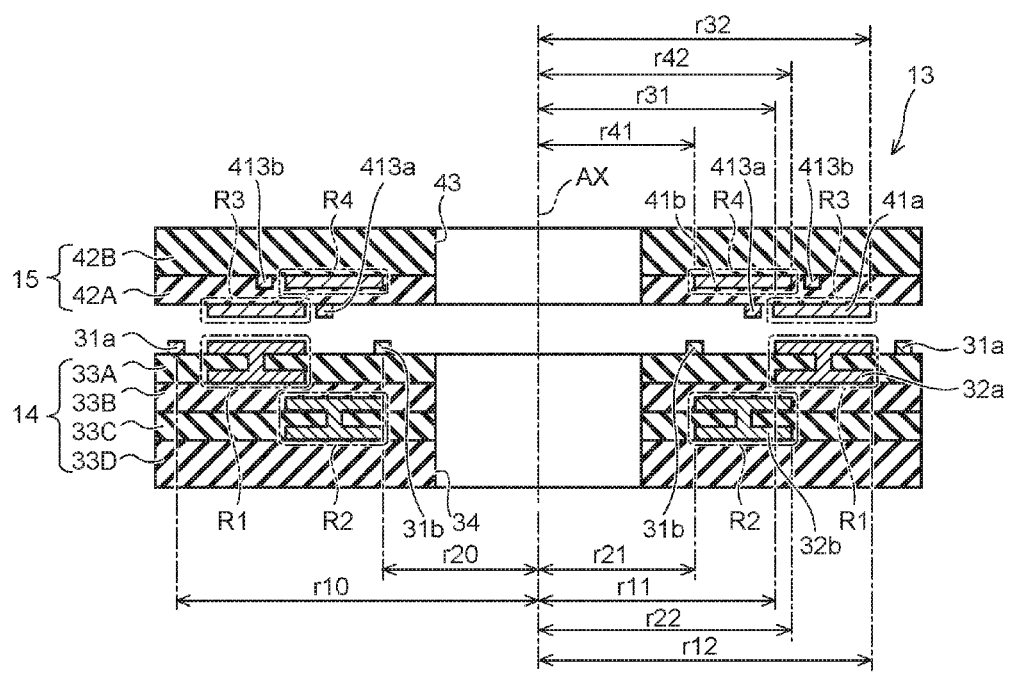
FIG. 13 is a cross section view illustrating an exemplary inductive detection type rotary encoder in a third embodiment of the present invention.

FIG. 13 is a cross section view illustrating an exemplary inductive detection type rotary encoder in a third embodiment of the present invention.

Figure 14:
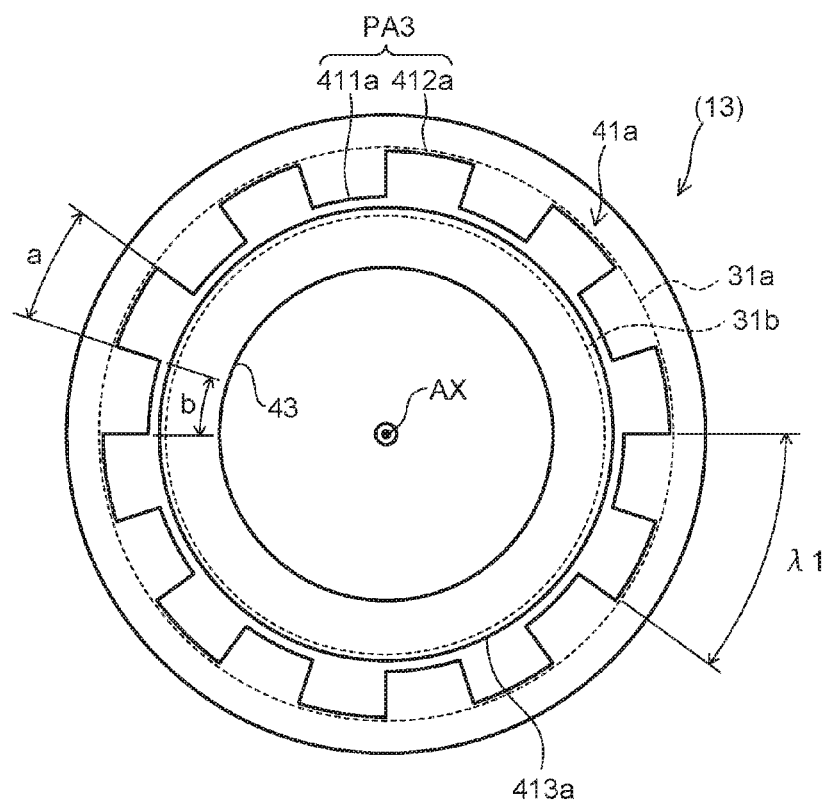
FIG. 14 is a plan view illustrating an exemplary magnetic flux coupling body in the third embodiment.
Figure 15:
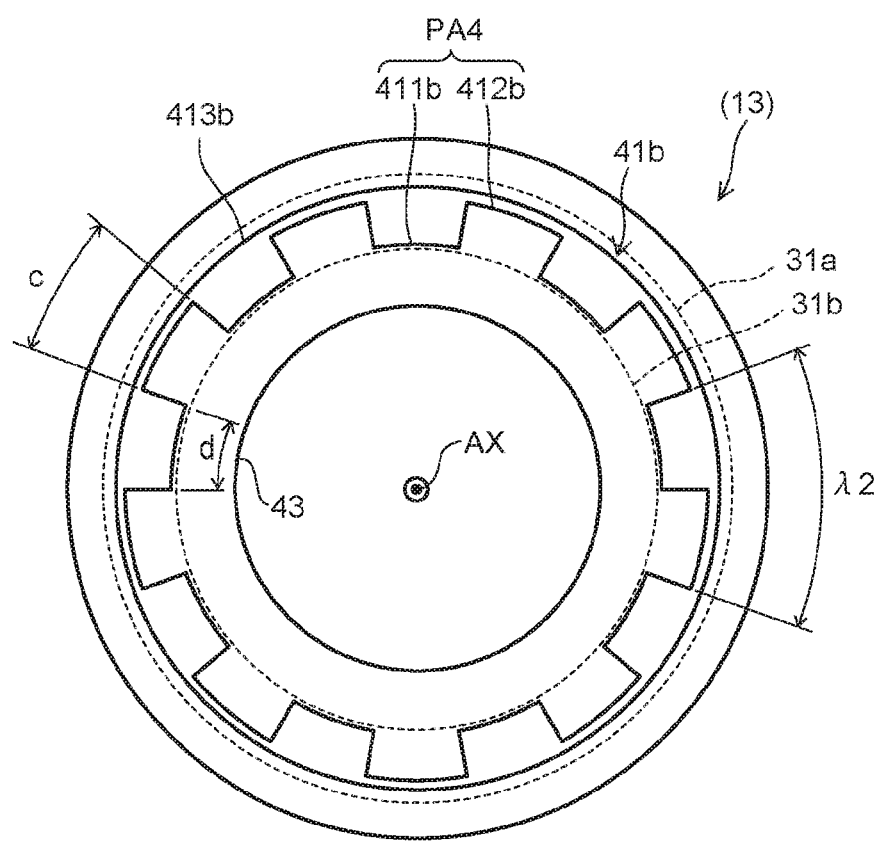
FIG. 15 is a plan view illustrating an exemplary magnetic flux coupling body in the third embodiment.

FIGS. 14 and 15 are plan views illustrating exemplary first and second magnetic flux coupling bodies, respectively, in the third embodiment.

An inductive detection type rotary encoder 13 in the third embodiment further includes a first circular current path 413a and a second circular current path 413b. The first circular current path 413a is provided in ring form on the inner side of a first magnetic flux coupling body 41a while being centered on a rotation axis AX. The second circular current path 413b is provided in ring form on the outer side of a second magnetic flux coupling body 41b while being centered on the rotation axis AX. Specifically, the first circular current path 413a is provided in ring form and independently of the first magnetic flux coupling body 41a; the second circular current path 413b is provided in ring form and independently of the second magnetic flux coupling body 41b. Aside from these, the configuration of the inductive detection type rotary encoder 13 in the third embodiment is substantially the same as that of the inductive detection type rotary encoder 11 in the first embodiment.

Similar to the second embodiment, the first circular current path 413a provided independently of the first magnetic flux coupling body 41a serves as a shield against the magnetic field from a second transmission winding 31b. Likewise, the second circular current path 413b provided independently of the second magnetic flux coupling body 41b serves as a shield against the magnetic field from a first transmission winding 31a.

In the third embodiment, providing the first circular current path 413a independently enables the first magnetic flux coupling body 41a to efficiently feed a current based on the magnetic field from the first transmission winding 31a. Likewise, providing the second circular current path 413b independently enables the second magnetic flux coupling body 41b to efficiently feed a current based on the magnetic field from the second transmission winding 31b.

The inductive detection type rotary encoder 13 in the third embodiment can provide highly accurate location detection with an influence of crosstalk reduced, by utilizing the shielding effects of the first circular current path 413a and the second circular current path 413b.

The absolute type encoder described in JP 2006-322927 A may disadvantageously have a large outside diameter, because the two tracks are disposed concentrically. The inductive detection type rotary encoder described in JP 2013-152163 A achieves a compact body by stacking the two tracks with equal outside diameters. This inductive detection type rotary encoder, however, has a problem in that the track other than a track being used for a measurement may emit noise components, that is, cause a crosstalk, possibly lowering measurement accuracy.

In contrast to the above, the inductive detection type rotary encoders 11, 12, and 13 in the first, second, and third embodiments, respectively, can achieve both a compact body and highly accurate location detection with an influence of crosstalk reduced.

Fourth Embodiment

Next, a fourth embodiment of the present invention will be described with reference to some accompanying drawings.

Figure 16:
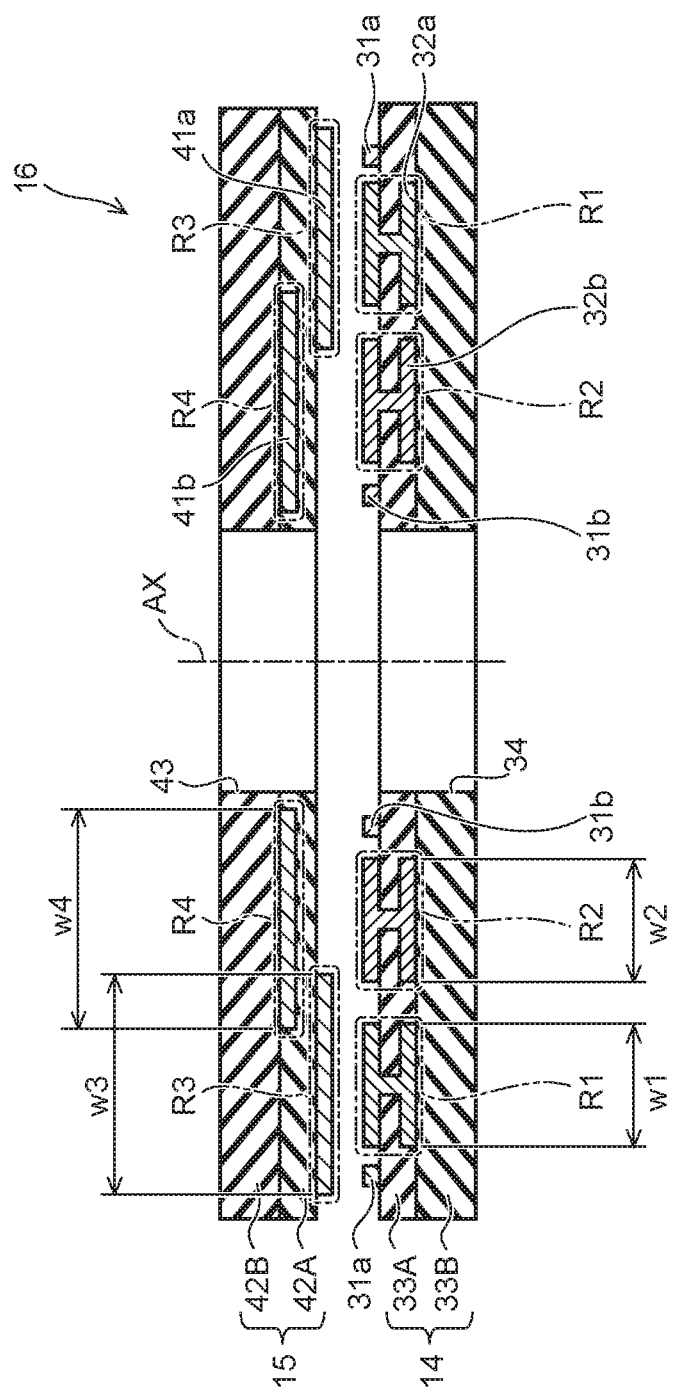
FIG. 16 is a schematic cross section view illustrating exemplary configurations of a stator and a rotor in a fourth embodiment.

FIG. 16 is a schematic cross section view illustrating an exemplary inductive detection type rotary encoder in the fourth embodiment of the present invention.

As illustrated in FIG. 16, an inductive detection type rotary encoder 16 in this embodiment has a stator 14 in which insulating layers 33A and 33B are stacked. The insulating layers 33A and 33B are stacked in this order in a direction away from the rotor 15. A hole 34 is formed across both the insulating layers 33A and 33B, and a spindle 7 is to pass through the hole 34.

A rotor 15 has insulating layers 42A and 42B stacked therein. The insulating layers 42A and 42B are stacked in a direction away from the stator 14. A hole 43 is formed across both the insulating layers 42A and 42B, and the spindle 7 is to pass through the hole 43.

The stator 14 is provided with a first reception winding 32a and a second reception winding 32b. The first reception winding 32a is formed within a first region R1; the first region R1 has a ring shape centered on a rotation axis AX. A part of the first reception winding 32a is formed on the surface of the insulating layer 33A which faces the rotor 15, whereas the other part thereof is formed between the insulating layer 33A and the insulating layer 33B. Both parts are interconnected through a through-hole or a via formed across the insulating layer 33A.

The second reception winding 32b is formed within a second region R2; the second region R2 has a ring shape centered on the rotation axis AX. The first region R1 and the second region R2 are disposed side by side in a radiation direction that is orthogonal to the rotation axis AX. In this embodiment, the first region R1 and the second region R2 are formed on the same layer, and the second region R2 is positioned on the inner side of the first region R1. A part of the second reception winding 32b is formed on the surface of the insulating layer 33A which faces the rotor 15, whereas the other part thereof is formed between the insulating layer 33A and the insulating layer 33B. Both parts are interconnected through a through-hole or a via formed across the insulating layer 33A.

The stator 14 is further provided with a first transmission winding 31a and a second transmission winding 31b; each of the first transmission winding 31a and the second transmission winding 31b has a ring shape centered on the rotation axis AX. The first transmission winding 31a is provided on the outer circumference of the stator 14, whereas the second transmission winding 31b is provided on the inner circumference of the stator 14. A current flows through the first transmission winding 31a while altering its flowing direction periodically. This current generates a magnetic field, with which a first magnetic flux coupling body 41a formed in the rotor 15 is irradiated. Likewise, a current flows through the second transmission winding 31b while altering its flowing direction periodically. This current generates a magnetic field, with which a second magnetic flux coupling body 41b formed in the rotor 15 is irradiated.

The rotor 15 is provided with the first magnetic flux coupling body 41a and the second magnetic flux coupling body 41b. The first magnetic flux coupling body 41a is formed within a third region R3; the third region R3 has a ring shape centered on the rotation axis AX. The first magnetic flux coupling body 41a is provided on the surface of the insulating layer 42A which faces the stator 14. The second magnetic flux coupling body 41b is formed within a fourth region R4; the fourth region R4 has a ring shape centered on the rotation axis AX. The second magnetic flux coupling body 41b is formed between the insulating layers 42A and 42B.

In this embodiment, the first region R1 overlaps the third region R3 and the second region R2 overlaps the fourth region R4 when viewed from the axial direction along the rotation axis AX. The first reception winding 32a provided within the first region R1 is positioned opposite the first magnetic flux coupling body 41a provided within the third region R3, thereby constituting a first track. Likewise, the second reception winding 32b provided within the second region R2 is positioned opposite the second magnetic flux coupling body 41b provided within the fourth region R4, thereby constituting a second track.

An operation of inductive detection type rotary encoder 16 will be described. In the inductive detection type rotary encoder 16, a transmission current flows through the first transmission winding 31a while altering the flow direction periodically. This transmission current generates a magnetic field, with which the first magnetic flux coupling body 41a formed in the rotor 15 is irradiated. Due to the magnetic flux coupling, an inductive current flows through the first magnetic flux coupling body 41a. In turn, the first reception winding 32a detects an inductive voltage on the basis of the magnetic field generated from the inductive current flowing through the first magnetic flux coupling body 41a.

In the inductive detection type rotary encoder 16, a transmission current flows through the second transmission winding 31b while altering the flow direction periodically. This transmission current generates a magnetic field, with which the second magnetic flux coupling body 41b formed in the rotor 15 is irradiated. Due to the magnetic flux coupling, an inductive current flows through the second magnetic flux coupling body 41b. In turn, the second reception winding 32b detects an inductive voltage on the basis of the magnetic field generated from the inductive current flowing through the second magnetic flux coupling body 41b.

In the inductive detection type rotary encoder 16 in this embodiment, a width w3 of the third region R3 in the radiation direction is greater than a width w1 of the first region R1 in the radiation direction. A width w4 of the fourth region R4 in the radiation direction is greater than a width w2 of the second region R2 in the radiation direction. Herein, the word "width" refers to a distance between the inner and outer sides of a ring-shaped region in a radiation direction. In the inductive detection type rotary encoder 16, the third region R3 overlaps partly the fourth region R4 in the axial direction.

According to the configuration described above, the first magnetic flux coupling body 41a and the second magnetic flux coupling body 41b are formed on different layers. Therefore, if the first magnetic flux coupling body 41a or the second magnetic flux coupling body 41b has a considerably great width in the radiation direction, there is no risk that the first magnetic flux coupling body 41a and the second magnetic flux coupling body 41b overlap each other. Thus, the configuration successfully both minimizes an increase in the outside diameter of the inductive detection type rotary encoder 16 and reduces an influence of the eccentricity of the stator 14 or the rotor 15 by widening the first magnetic flux coupling body 41a and the second magnetic flux coupling body 41b in the radiation direction.

Decreasing the widths w3 and w4 tend to reduce an influence of crosstalk but increase an influence of the eccentricity of the stator 14 or the rotor 15. On the other hand, increasing the widths w3 and w4 tends to reduce an influence of the eccentricity of the stator 14 or the rotor 15 but increase an influence of crosstalk.

Figure 17:
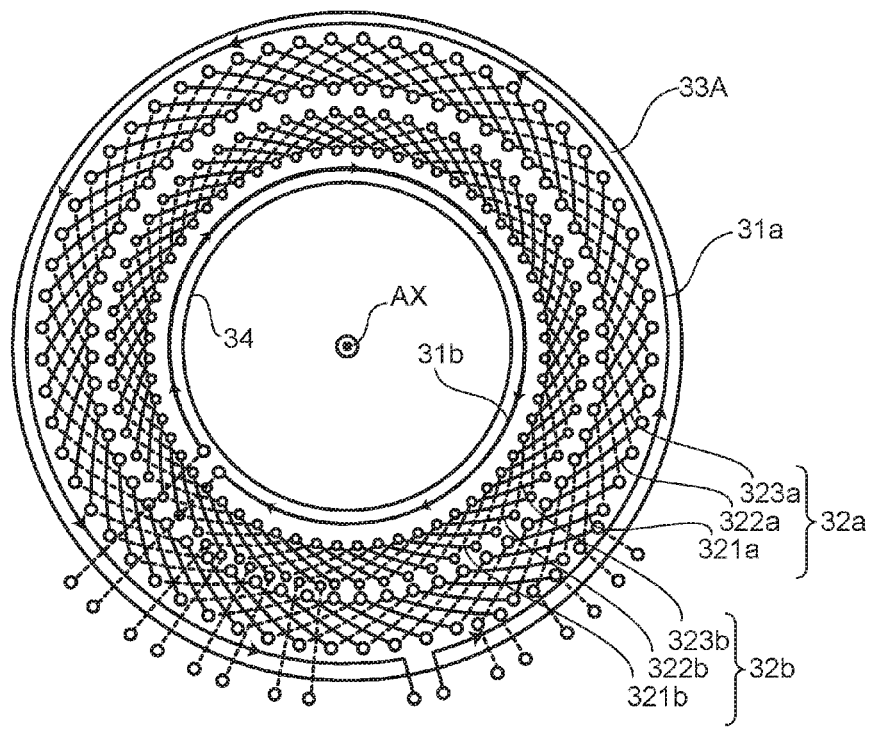
FIG. 17 is a plan view illustrating an exemplary transmission winding and first and reception winding in the fourth embodiment.

FIG. 17 is a plan view illustrating exemplary first and second transmission windings and first and second reception windings in the fourth embodiment. As illustrated in FIG. 17, the first transmission winding 31a is disposed close to the outer circumference of the insulating layer 33A, whereas the second transmission winding 31b is disposed close to the hole 34.

The first reception winding 32a is positioned between the first transmission winding 31a and the second transmission winding 31b and closer to the first transmission winding 31a. The first reception winding 32a includes three reception winding sections 321a to 323a having different phases in a rotational direction of the rotor 15. The reception winding sections 321a to 323a are aligned vertically at their intersections with the insulating layer 33A therebetween and interconnected there through through-holes or vias. The reception winding sections 321a to 323a are thereby disposed while being separated and insulated from one another.

The second reception winding 32b is positioned between the first transmission winding 31a and the second transmission winding 31b and closer to the second transmission winding 31b. In other words, the second reception winding 32b is positioned on the inner side of the first reception winding 32a. The second reception winding 32b includes three reception winding sections 321b to 323b having different phases in the rotational direction. The reception winding sections 321b to 323b are aligned vertically at their intersections with the insulating layer 33A therebetween and interconnected there through through-holes or vias. The reception winding sections 321b to 323b are thereby disposed while being separated and insulated from one another.

Figure 18:
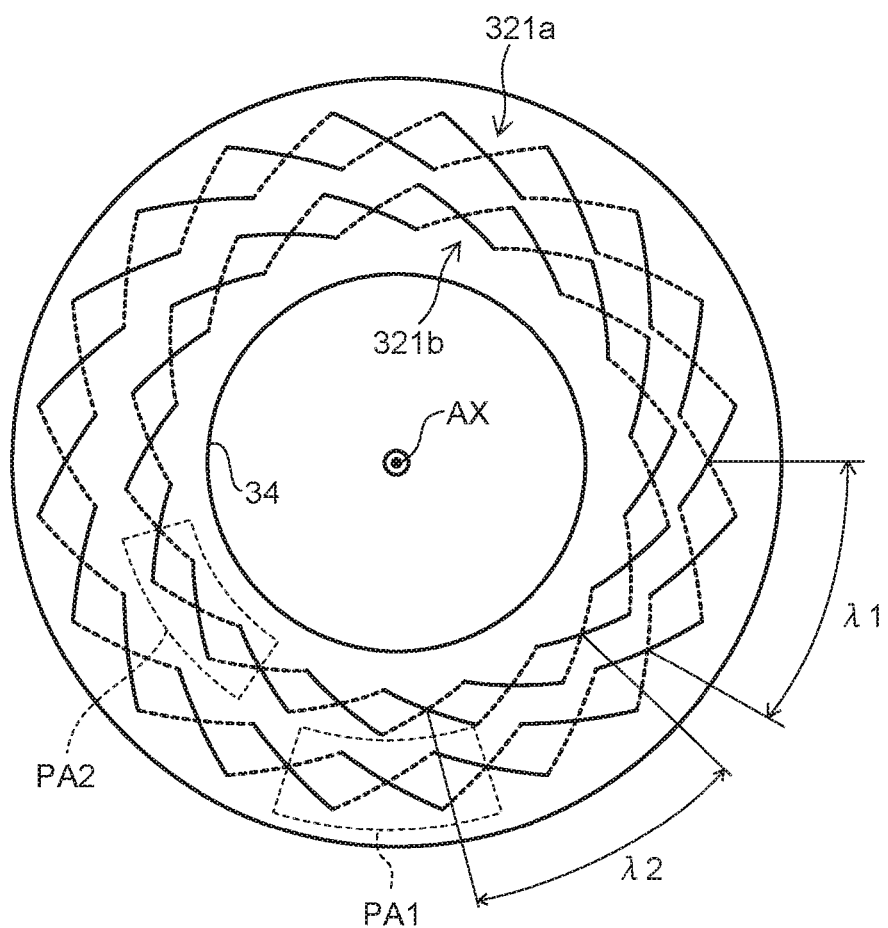
FIG. 18 is a plan view illustrating exemplary reception winding sections in the first reception winding and the second reception winding in the fourth embodiment.

FIG. 18 is a plan view illustrating exemplary reception winding sections in the first reception winding and the second reception winding in the fourth embodiment.

As illustrated in FIG. 18, the reception winding section 321a has a looped (rhombic) pattern that periodically alters the shape at pitches λ1 in the rotational direction of the rotor 15. Specifically, ten rhombic pattern pairs PA1 are provided in the reception winding section 321a. Each of the reception winding sections 322a and 323a has substantially the same shape as in the reception winding section 321a.

The reception winding section 321b has a looped (rhombic) pattern that periodically alters the shape at pitches λ2 in the rotational direction of the rotor 15, and each pitch λ2 differs from each pitch λ1. For example, each pitch λ2 is longer than each pitch λ1. In other words, each pitch λ1 is shorter than each pitch λ2. Specifically, nine rhombic pattern pairs PA2 are provided in the reception winding section 321b. Each of the reception winding sections 322b and 323b has substantially the same shape as in the reception winding section 321b.

Figure 19:
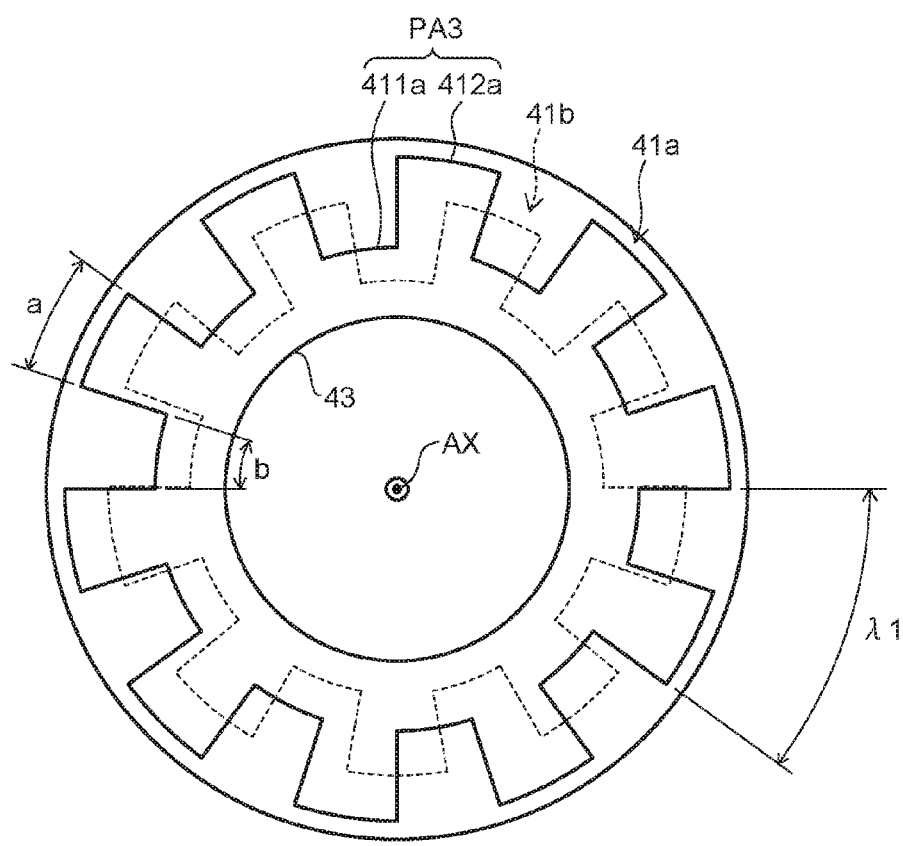
FIG. 19 is a plan view illustrating an exemplary first magnetic flux coupling body in the fourth embodiment.

FIG. 19 is a plan view illustrating an exemplary first magnetic flux coupling body in the fourth embodiment.

As illustrated in FIG. 19, the first magnetic flux coupling body 41a is formed over the first reception winding 32a with a gap therebetween while being coaxial with the rotation axis AX of the spindle 7. The first magnetic flux coupling body 41a has a continuous toothed pattern that periodically alters the shape at pitches λ1 in the rotational direction of the rotor 15, and each of these pitches λ1 is equal to each pitch λ1 of the first reception winding 32a.

The first magnetic flux coupling body 41a includes depressions 411a and projections 412a arranged alternately; each depression 411a is depressed in a direction toward the spindle 7, and each projection 412a protrudes in a direction away from the spindle 7. In the example of FIG. 19, ten pattern pairs PA3, each of which has a depression 411a and a projection 412a, are provided. The first magnetic flux coupling body 41a is provided so as to overlap the second magnetic flux coupling body 41b partly when viewed from the axial direction.

Figure 20:
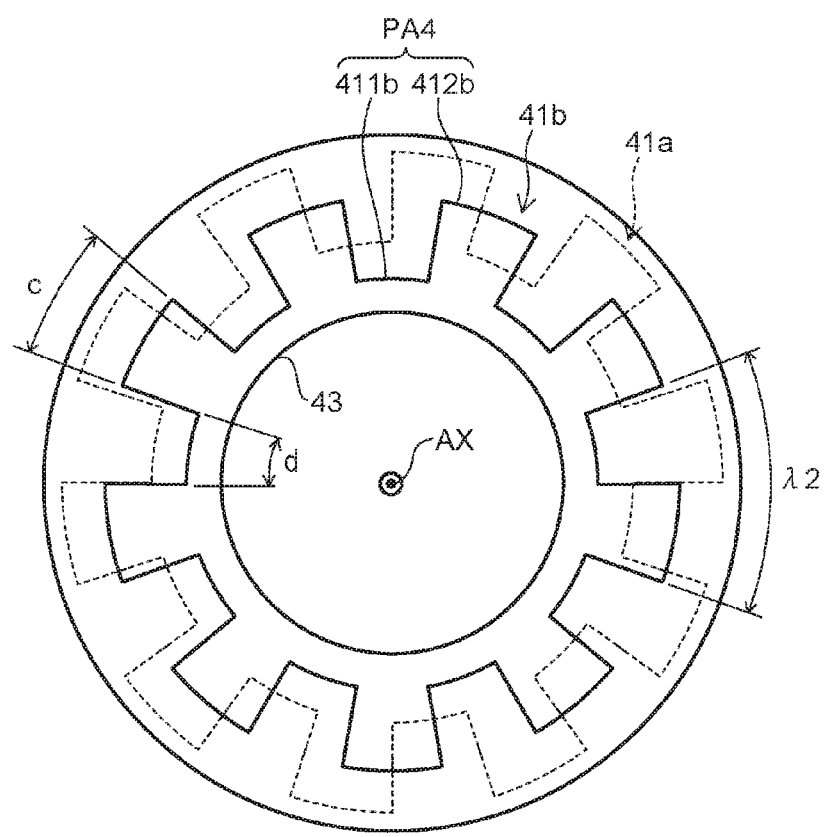
FIG. 20 is a plan view illustrating an exemplary second magnetic flux coupling body in the fourth embodiment.

FIG. 20 is a plan view illustrating an exemplary second magnetic flux coupling body in the fourth embodiment.

As illustrated in FIG. 20, the second magnetic flux coupling body 41b is formed coaxially with the rotation axis AX of the spindle 7. In addition, the second magnetic flux coupling body 41b has a toothed shape in which depressions 411b and projection 412b are formed alternately, similar to the first magnetic flux coupling body 41a.

Pairs of the depressions 411b and projections 412b in the second magnetic flux coupling body 41b are arranged at pitches λ2. In the example illustrated in FIG. 20, nine pattern pairs PA4 of depressions 411b and projections 412b are provided. The first magnetic flux coupling body 41a and the second magnetic flux coupling body 41b may have a toothed pattern, a sine-wave pattern, an island-shaped pattern, or any other patterns.

Since the first magnetic flux coupling body 41a and the second magnetic flux coupling body 41b are formed on different layers, the width w3 of the first magnetic flux coupling body 41a and the width w4 of the second magnetic flux coupling body 41b can be increased without causing the first magnetic flux coupling body 41a to interfere with the second magnetic flux coupling body 41b. Therefore, the widths w3 and w4 can be increased without increasing the outside diameter of the inductive detection type rotary encoder 11. Consequently, the inductive detection type rotary encoder 11 is less sensitive to an influence of the eccentricity of a stator 14 or a rotor 15.

Fifth Embodiment

Next, a fifth embodiment of the present invention will be described with reference to some accompanying drawings.

Figure 21:
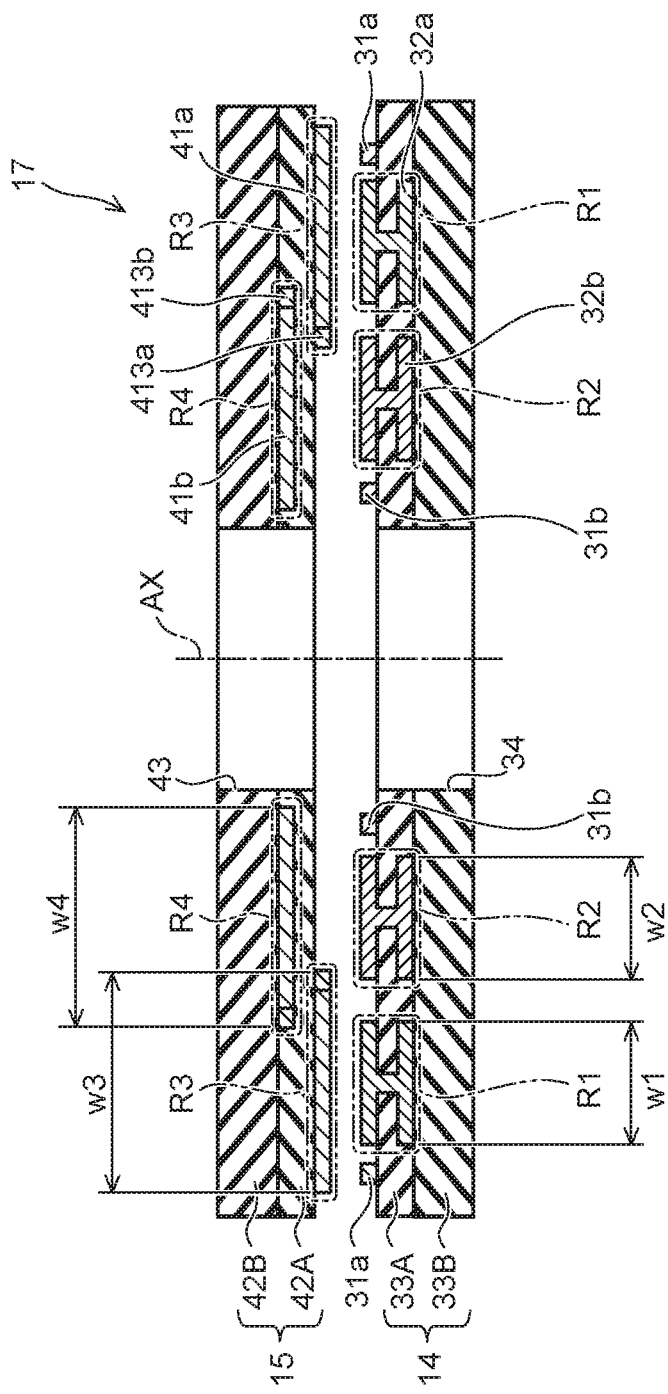
FIG. 21 is a cross section view illustrating an exemplary inductive detection type rotary encoder in a fifth embodiment of the present invention.

FIG. 21 is a cross section view illustrating an exemplary inductive detection type rotary encoder in a fifth embodiment of the present invention.

Figure 22:
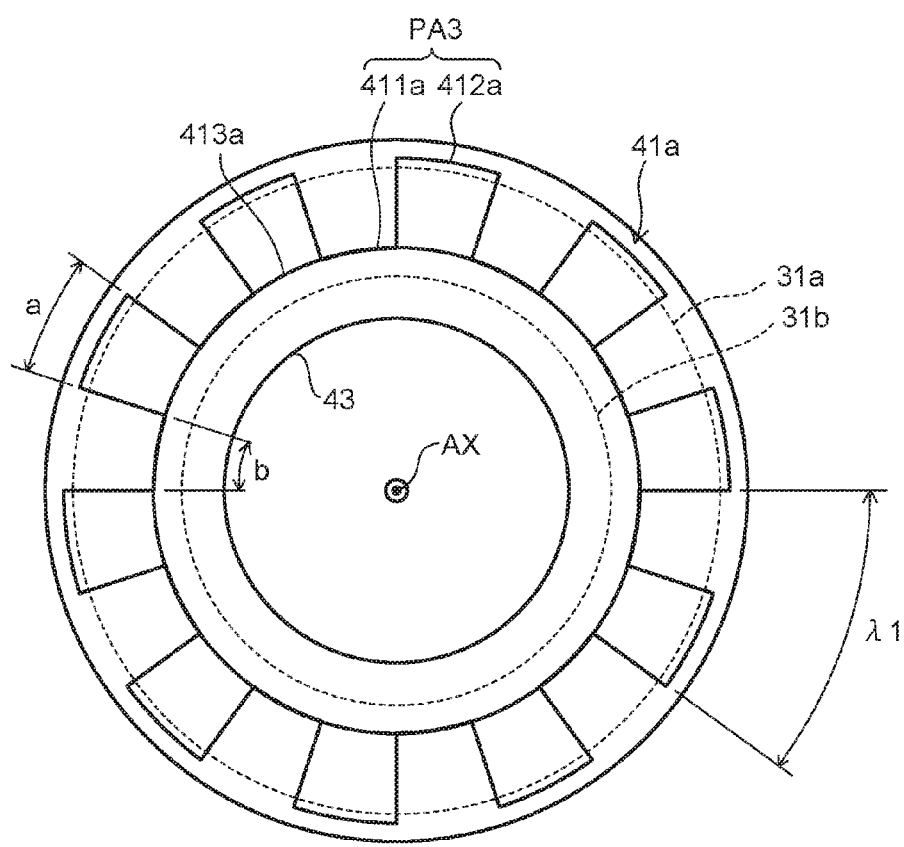
FIG. 22 is a plan view illustrating an exemplary magnetic flux coupling body in the fifth embodiment.
Figure 23:
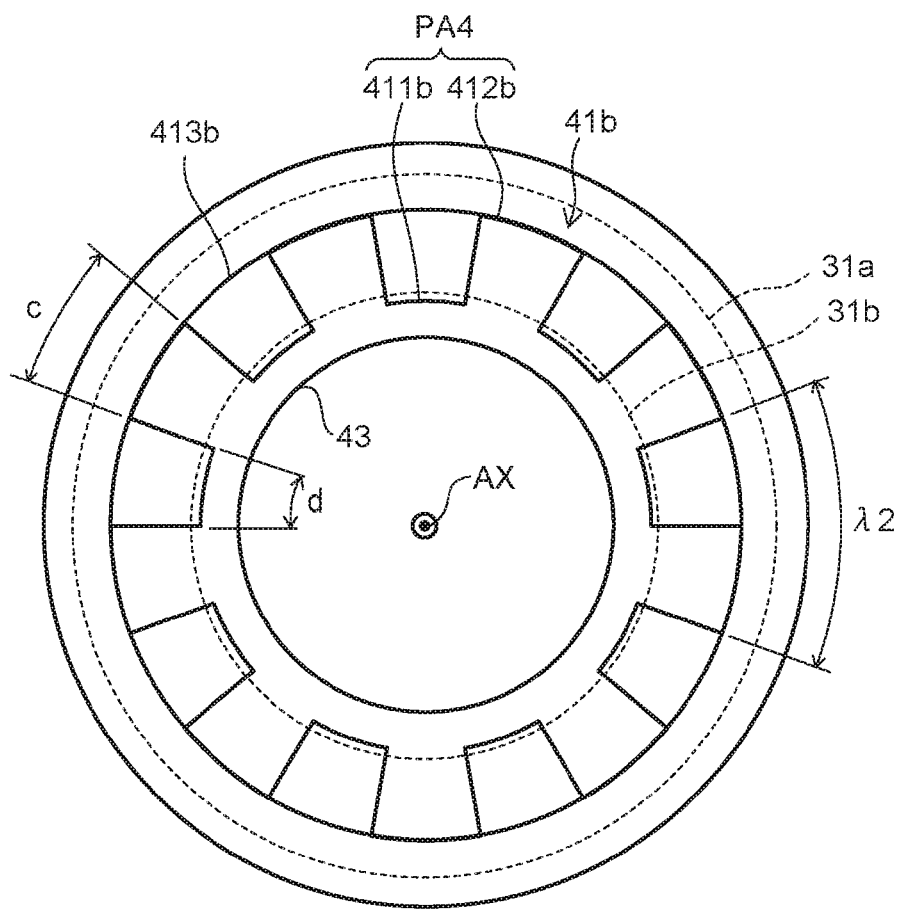
FIG. 23 is a plan view illustrating an exemplary magnetic flux coupling body in the fifth embodiment.

FIGS. 22 and 23 are plan views illustrating exemplary first and second magnetic flux coupling bodies, respectively, in the fifth embodiment.

In an inductive detection type rotary encoder 17 in the fifth embodiment, a first magnetic flux coupling body 41a includes a first circular current path 413a, and a second magnetic flux coupling body 41b includes a second circular current path 413b.

As illustrated in FIG. 22, the inductive detection type rotary encoder 17 in the fifth embodiment is provided with the first circular current path 413a in the first magnetic flux coupling body 41a. The first circular current path 413a has a ring shape centered on a rotation axis AX and its radius is nearly equal to the inside radius of the first magnetic flux coupling body 41a. The first circular current path 413a shares its portion with depressions 411a.

As illustrated in FIG. 23, the second circular current path 413b is provided in the second magnetic flux coupling body 41b. The second circular current path 413b has a ring shape centered on the rotation axis AX and its radius is nearly equal to the outside radius of the second magnetic flux coupling body 41b. The second circular current path 413b shares its portion with projections 412b.

The configuration of the inductive detection type rotary encoder 17 in the fifth embodiment is substantially the same as that of the inductive detection type rotary encoder 16 in the fourth embodiment, aside from the first magnetic flux coupling body 41a and the second magnetic flux coupling body 41b. In the inductive detection type rotary encoder 17 in the fifth embodiment, the first circular current path 413a and the second circular current path 413b each serve as an electromagnetic shield.

To give an example, the first circular current path 413a is provided on the side of the first magnetic flux coupling body 41a which is closer to a second transmission winding 31b. Thus, the first circular current path 413a can come under the influence of the magnetic field generated from the second transmission winding 31b, and prevent the influence of the magnetic field on the first magnetic flux coupling body 41a. In this case, the first circular current path 413a serves as a shield against the magnetic field generated from the second transmission winding 31b. Using the first circular current path 413a as the shield reduces the influence that the magnetic field generated from the second transmission winding 31b exerts upon the first magnetic flux coupling body 41a. This enables the first magnetic flux coupling body 41a to adequately feed a current based on the magnetic field from a first transmission winding 31a.

Likewise, the second circular current path 413b is provided on the side of the second magnetic flux coupling body 41b which is closer to the first transmission winding 31a. Thus, the second circular current path 413b can come under the influence of the magnetic field generated from the first transmission winding 31a, and prevent the influence of the magnetic field on the second magnetic flux coupling body 41b. In this case, the second circular current path 413b serves as a shield against the magnetic field generated from the first transmission winding 31a. Using the second circular current path 413b as the shield reduces the influence that the magnetic field generated from the first transmission winding 31a exerts upon the second magnetic flux coupling body 41b. This enables the second magnetic flux coupling body 41b to adequately feed a current based on the magnetic field from the second transmission winding 31b.

The inductive detection type rotary encoder 17 in the fifth embodiment can provide highly accurate location detection with an influence of crosstalk reduced, by utilizing the shielding effects of the first circular current path 413a and the second circular current path 413b.

Sixth Embodiment

Next, a sixth embodiment of the present invention will be described with reference to some accompanying drawings.

Figure 24:
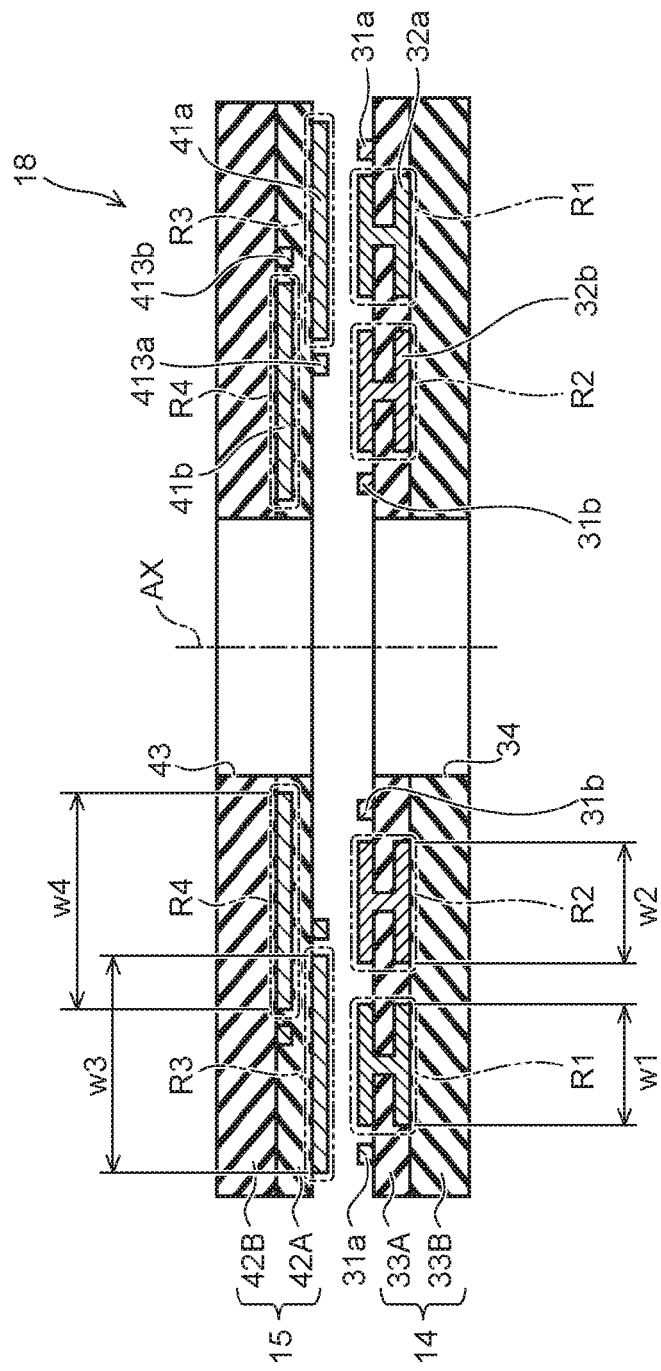
FIG. 24 is a cross section view illustrating an exemplary inductive detection type rotary encoder in a sixth embodiment of the present invention.

FIG. 24 is a cross section view illustrating an exemplary inductive detection type rotary encoder in the sixth embodiment of the present invention.

Figure 25:
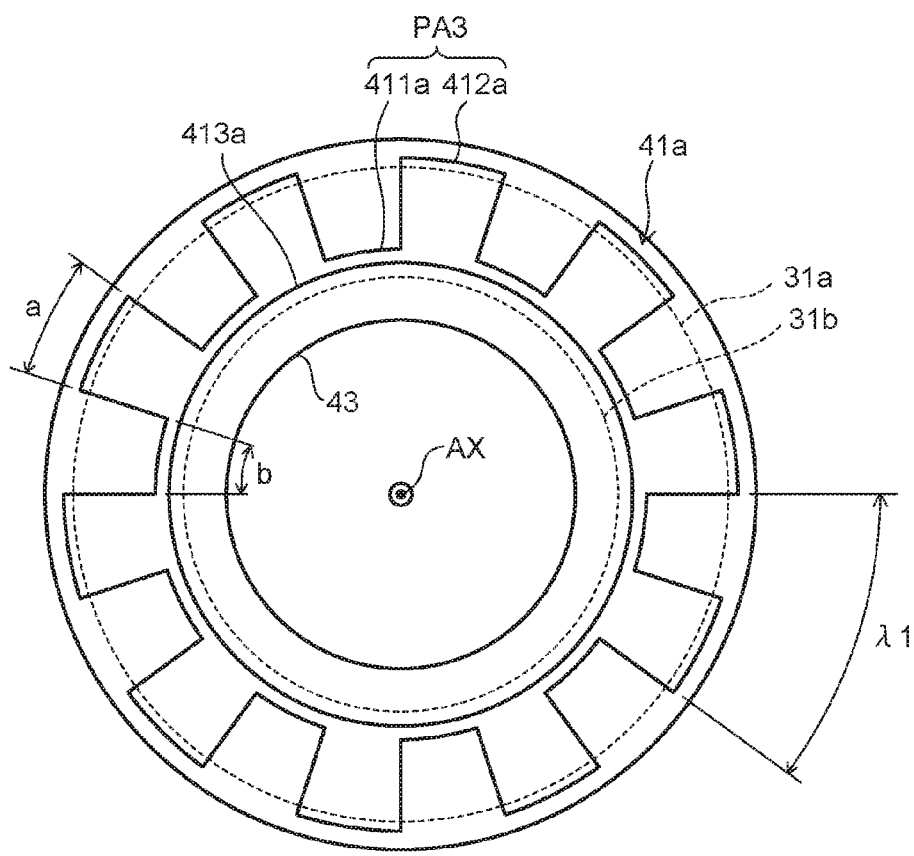
FIG. 25 is a plan view illustrating an exemplary magnetic flux coupling body in the sixth embodiment.
Figure 26:
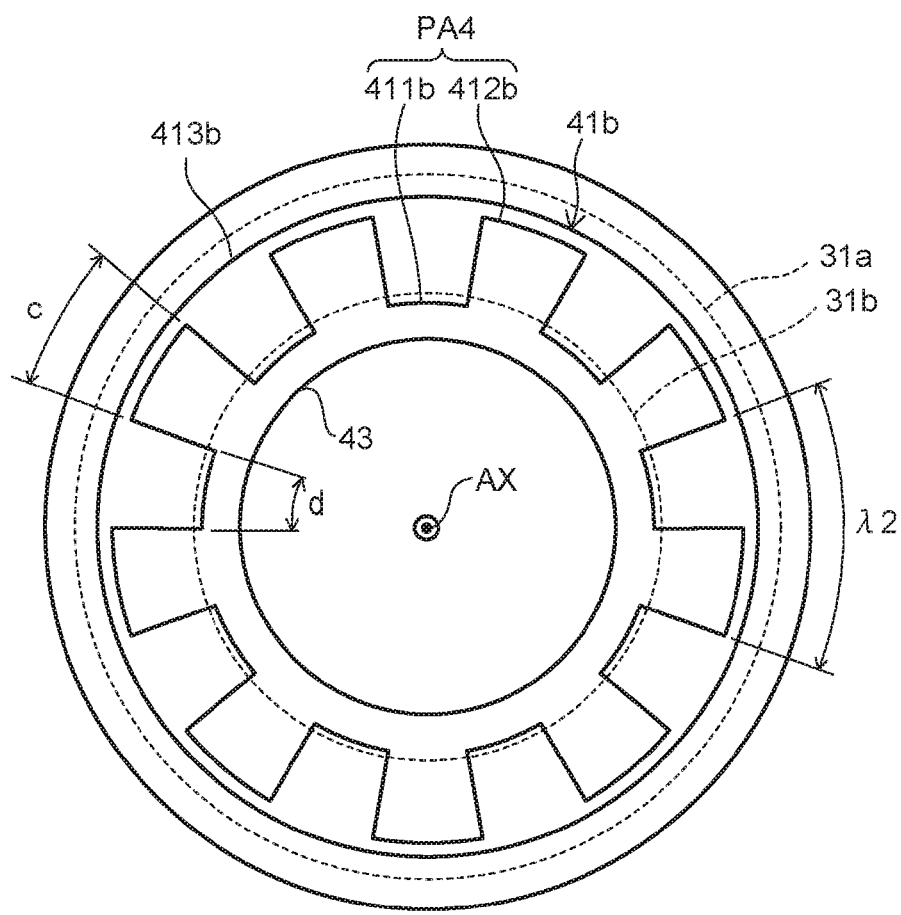
FIG. 26 is a plan view illustrating an exemplary magnetic flux coupling body in the sixth embodiment.

FIGS. 25 and 26 are plan views illustrating an exemplary first magnetic flux coupling body and second magnetic flux coupling body, respectively, in the sixth embodiment.

An inductive detection type rotary encoder 18 in the sixth embodiment includes a first circular current path 413a and a second circular current path 413b. The first circular current path 413a is provided in ring form on the inner side of a first magnetic flux coupling body 41a while being centered on a rotation axis AX. The second circular current path 413b is provided in ring form on the outer side of a second magnetic flux coupling body 41b while being centered on the rotation axis AX. Specifically, the first circular current path 413a is provided in ring form and independently of the first magnetic flux coupling body 41a; the second circular current path 413b is provided in ring form and independently of the second magnetic flux coupling body 41b. Aside from these, the configuration of the inductive detection type rotary encoder 18 in the sixth embodiment is substantially the same as that of the inductive detection type rotary encoder 16 in the fourth embodiment.

Similar to the fifth embodiment, the first circular current path 413a provided independently of the first magnetic flux coupling body 41a serves as a shield against the magnetic field from a second transmission winding 31b. Likewise, the second circular current path 413b provided independently of the second magnetic flux coupling body 41b serves as a shield against the magnetic field from a first transmission winding 31a.

In the sixth embodiment, providing the first circular current path 413a independently enables the first magnetic flux coupling body 41a to efficiently feed a current based on the magnetic field from the first transmission winding 31a. Likewise, providing the second circular current path 413b independently enables the second magnetic flux coupling body 41b to efficiently feed a current based on the magnetic field from the second transmission winding 31b.

The inductive detection type rotary encoder 18 in the sixth embodiment can provide highly accurate location detection with an influence of crosstalk reduced, by utilizing the shielding effects of the first circular current path 413a and the second circular current path 413b.

As for an absolute type encoder as described in JP 4869769 B1 or JP 5540308 B1, in order to decrease its outside diameter, the spacing of adjacent tracks needs to be decreased. However, the outside diameter has a lower limit; specifically, the width of a magnetic flux coupling body in a radiation direction needs to be equal to or slightly greater than the width of a reception winding in the radiation direction. Furthermore, when the width of a magnetic flux coupling body in a radiation direction is decreased, the detection accuracy of an encoder may be lowered. This is because when a stator or a rotor is eccentric to its rotation axis, for example, a signal to be detected in relation to the rotation of the rotor may be biased.

The inductive detection type rotary encoders 16, 17, and 18 in the fourth, fifth, and sixth embodiment, respectively, can achieve a compact body with its detection accuracy less sensitive to eccentricity of the stator or rotor or a misalignment therebetween.

It should be noted that the foregoing embodiments are exemplary and not intended to limit the present invention. Any additions, deletions, and design modifications of constituent elements in the embodiments which those skilled in the art could conceive of and any combinations of features of the embodiments, for example, can also fall within the scope of the present invention, as long as they contain the spirit of the present invention.

INDUSTRIAL APPLICABILITY

As described above, the present invention is applicable suitably to digital micrometers, digital indicators, and any other measuring devices that read a measurement by detecting a rotation amount.

What is claimed is:
1. An inductive detection type rotary encoder comprising:
a stator;
a rotor provided opposite the stator so as to be rotatable around a rotation axis;
a first transmission winding provided in the stator, the first transmission winding having a first radius centered on the rotation axis;

a second transmission winding provided in the stator, the second transmission winding having a second radius centered on the rotation axis;

a first reception winding provided in the stator, the first reception winding being formed within a first region, the first region having a ring shape centered on the rotation axis, the first reception winding having a first inside radius and a first outside radius centered on the rotation axis;

a second reception winding provided in the stator, the second reception winding being formed within a second region, the second region having a ring shape centered on the rotation axis, the first and second reception windings being formed with a first insulating layer therebetween, the second reception winding having a second inside radius and a second outside radius centered on the rotation axis;

a first magnetic flux coupling body provided in the rotor, the first magnetic flux coupling body being formed within a third region, the third region being a ring-shaped region centered on the rotation axis and overlapping the first region in an axial direction along the rotation axis, the first magnetic flux coupling body having a third inside radius and a third outside radius centered on the rotation axis; and a second magnetic flux coupling body provided in the rotor, the second magnetic flux coupling body being formed within a fourth region, the fourth region being a ring-shaped region centered on the rotation axis and overlapping the second region in the axial direction, the first and second magnetic flux coupling bodies being formed with a second insulating layer therebetween, the second magnetic flux coupling body having a fourth inside radius and a fourth outside radius centered on the rotation axis, wherein the second region, the first region, the third region, and the fourth region are disposed in this order in the axial direction, a shortest distance between the first transmission winding and the first magnetic flux coupling body is shorter than a shortest distance between the second transmission winding and the first magnetic flux coupling body, a shortest distance between the second transmission winding and the second magnetic flux coupling body is shorter than a shortest distance between the first transmission winding and the second magnetic flux coupling body, the shortest distance between the first transmission winding and the first magnetic flux coupling body is shorter than the shortest distance between the first transmission winding and the second magnetic flux coupling body, and the shortest distance between the second transmission winding and the second magnetic flux coupling body is shorter than the shortest distance between the second transmission winding and the first magnetic flux coupling body.

2. The inductive detection type rotary encoder according to claim 1, wherein the first inside radius is larger than the second inside radius, the second outside radius is equal to or larger than the first inside radius, and the first outside radius is larger than the second outside radius.

3. The inductive detection type rotary encoder according to claim 1, wherein the third inside radius is larger than the fourth inside radius, the fourth outside radius is equal to or larger than the third inside radius, and the third outside radius is larger than the fourth outside radius.

4. The inductive detection type rotary encoder according to claim 1, wherein the first radius is larger than the first outside radius, and the second radius is smaller than the first inside radius.

5. The inductive detection type rotary encoder according to claim 1, wherein the first transmission winding and the second transmission winding are provided on the same layer.

6. The inductive detection type rotary encoder according to claim 1, wherein each of the first magnetic flux coupling body and the first reception winding is provided so as to alter its shape periodically at first pitches in a rotation direction centered on the rotation axis, and each of the second magnetic flux coupling body and the second reception winding is provided so as to alter its shape periodically at second pitches in the rotation direction centered on the rotation axis, each second pitch differing from each first pitch.

7. The inductive detection type rotary encoder according to claim 1, wherein the first magnetic flux coupling body includes a first circular current path provided in a ring shape, and the first circular current path has a radius that is centered on the rotation axis and equal to the third inside radius, and the second magnetic flux coupling body includes a second circular current path provided in a ring shape, and the second circular current path has a radius that is centered on the rotation axis and equal to the fourth outside radius.

8. The inductive detection type rotary encoder according to claim 1, further comprising:

a first circular current path provided in a ring shape centered on the rotation axis, the first circular current path being positioned on an inner side of the first magnetic flux coupling body; and a second circular current path provided in a ring shape centered on the rotation axis, the second circular current path being positioned on an outer side of the second magnetic flux coupling body.

9. An inductive detection type rotary encoder comprising:

a stator;

a rotor provided opposite the stator so as to be rotatable around a rotation axis;

a first reception winding provided in the stator, the first reception winding being formed within a first region, the first region having a ring shape centered on the rotation axis;

a second reception winding provided in the stator, the second reception winding being formed within a second region, the second region having a ring shape, the first and second regions being disposed side by side in a radiation direction, the radiation direction being orthogonal to the rotation axis, a first transmission winding provided in the stator, the first transmission winding being positioned on a first side of the first region, the first side being opposite to a second side of the first region on which the second region is formed;

a second transmission winding provided in the stator, the second transmission winding being positioned on a second side of the second region, the second side being opposite to a first side of the second region on which the first region is formed;
a first magnetic flux coupling body provided in the rotor, the first magnetic flux coupling body being formed within a third region, the third region having a ring shape centered on the rotation axis and overlapping the first region in an axial direction along the rotation axis; and
a second magnetic flux coupling body provided in the rotor, the second magnetic flux coupling body being formed within a fourth region, the fourth region having a ring shape centered on the rotation axis and overlapping the second region in the axial direction,
wherein the third region has a greater width than the first region in the radiation direction,
the fourth region has a greater width than the second region in the radiation direction, and
the third region overlaps partly the fourth region in the axial direction.

10. The inductive detection type rotary encoder according to claim 9, wherein
the first transmission winding and the second transmission winding are provided on the same layer.

11. The inductive detection type rotary encoder according to claim 9, wherein
each of the first magnetic flux coupling body and the first reception winding is provided so as to alter its shape periodically at first pitches in a rotation direction centered on the rotation axis, and each of the second magnetic flux coupling body and the second reception winding is provided so as to alter its shape periodically at second pitches in the rotation direction centered on the rotation axis, each second pitch differing from each first pitch.

12. The inductive detection type rotary encoder according to claim 9, wherein
the first magnetic flux coupling body includes a first circular current path provided in a ring shape, and the first circular current path has a radius that is centered on the rotation axis and equal to an inside radius of the first magnetic flux coupling body, and
the second magnetic flux coupling body includes a second circular current path provided in a ring shape, and the second circular current path has a radius that is centered on the rotation axis and equal to an outside radius of the second magnetic flux coupling body.

13. The inductive detection type rotary encoder according to claim 9, further comprising:
a first circular current path provided in a ring shape centered on the rotation axis, the first circular current path being positioned on an inner side of the first magnetic flux coupling body; and
a second circular current path provided in a ring shape centered on the rotation axis, the second circular current path being positioned on an outer side of the second magnetic flux coupling body.

* * * * *